United States Patent
Mishra et al.

(10) Patent No.: US 10,567,771 B2
(45) Date of Patent: Feb. 18, 2020

(54) SYSTEM AND METHOD FOR COMPRESSING VIDEO DATA

(71) Applicant: Miovision Technologies Incorporated, Kitchener (CA)

(72) Inventors: Akshaya K. Mishra, Kitchener (CA); Justin A. Eichel, Waterloo (CA); Douglas J. Swanson, Petersburg (CA); Nicholas D. Jankovic, Waterloo (CA); Nicholas Miller, Kitchener (CA)

(73) Assignee: Miovision Technologies Incorporated, Kitchener (CA)

( * ) Notice: Subject to any disclaimer, the term of this patent is extended or adjusted under 35 U.S.C. 154(b) by 22 days.

(21) Appl. No.: 14/957,079

(22) Filed: Dec. 2, 2015

(65) Prior Publication Data

US 2016/0173882 A1  Jun. 16, 2016

Related U.S. Application Data

(60) Provisional application No. 62/091,951, filed on Dec. 15, 2014.

(51) Int. Cl.
*H04N 19/136* (2014.01)
*G06K 9/00* (2006.01)
*H04N 19/426* (2014.01)

(52) U.S. Cl.
CPC ....... *H04N 19/136* (2014.11); *G06K 9/00718* (2013.01); *H04N 19/426* (2014.11)

(58) Field of Classification Search
CPC . H04N 19/136; H04N 19/426; G06K 9/00718
See application file for complete search history.

(56) References Cited

U.S. PATENT DOCUMENTS

| | | | | |
|---|---|---|---|---|
| 7,227,893 | B1 * | 6/2007 | Srinivasa | G06K 9/00771 348/155 |
| 2007/0160289 | A1 | 7/2007 | Lipton et al. | |
| 2008/0270569 | A1 * | 10/2008 | McBride | G06F 17/30017 709/217 |
| 2012/0036016 | A1 | 2/2012 | Hoffberg et al. | |
| 2012/0268594 | A1 | 10/2012 | Haering et al. | |

(Continued)

FOREIGN PATENT DOCUMENTS

| | | |
|---|---|---|
| CA | 2722300 A1 | 11/2008 |
| WO | 2007/139658 A1 | 12/2007 |
| WO | 2009/017687 A1 | 2/2009 |

OTHER PUBLICATIONS

Cartile, T.; International Search Report from corresponding PCT Application No. PCT/CA2015/051261; search completed Feb. 22, 2016.

(Continued)

*Primary Examiner* — Christopher S Kelley
*Assistant Examiner* — Nasim N Nirjhar
(74) *Attorney, Agent, or Firm* — Brett J. Slaney; Blake, Cassels & Graydon LLP

(57) ABSTRACT

A system and method are provided for compressing video data, the method comprising: obtaining video data; extracting at least one object of interest from the video data using at least one classifier associated with at least one feature detectable in the video data; and preparing compressed video data comprising at least one object of interest extracted from the video data.

24 Claims, 21 Drawing Sheets

(56) References Cited

U.S. PATENT DOCUMENTS

2013/0088600 A1* 4/2013 Wu .................. G08G 1/054
                                                      348/149
2014/0293048 A1   10/2014 Titus et al.
2017/0255648 A1*  9/2017 Dube ................ G06F 16/583

OTHER PUBLICATIONS

Andre, T.; Supplementary Search Report from corresponding European Application No. 15868765.7; search completed Jun. 5, 2018.

* cited by examiner

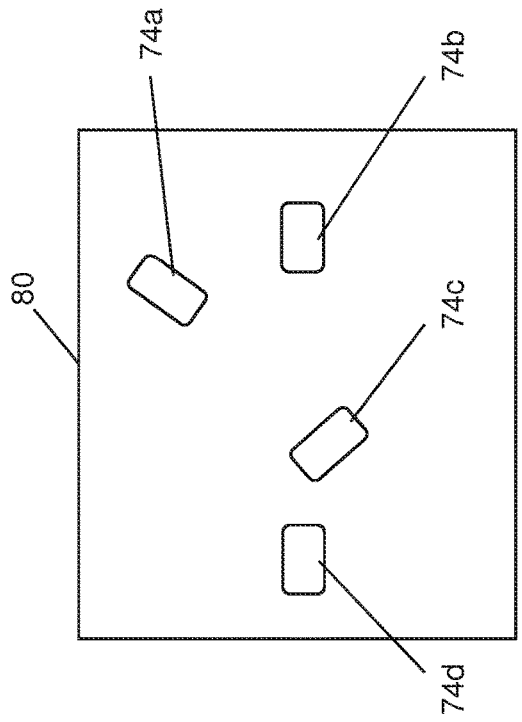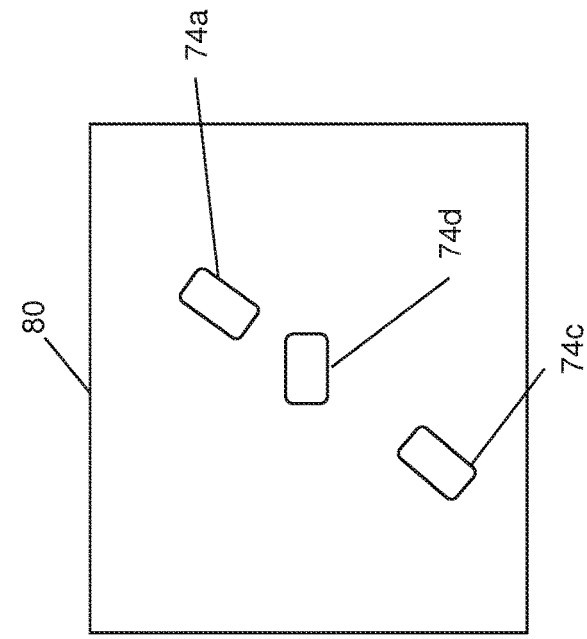
FIG. 6(a)
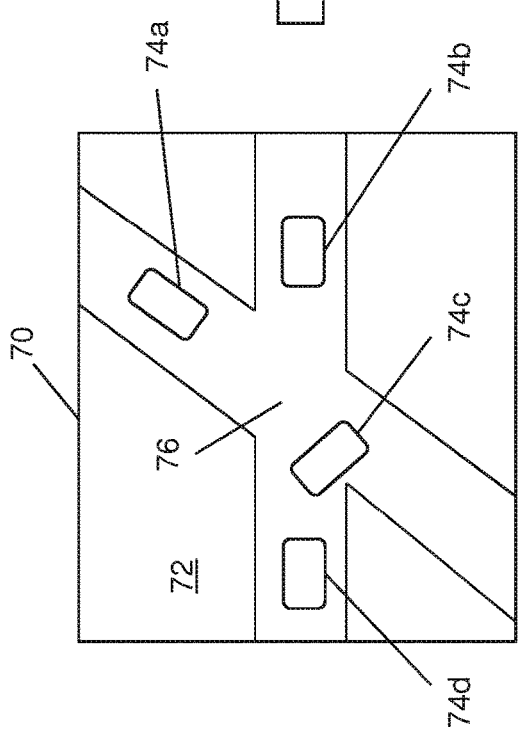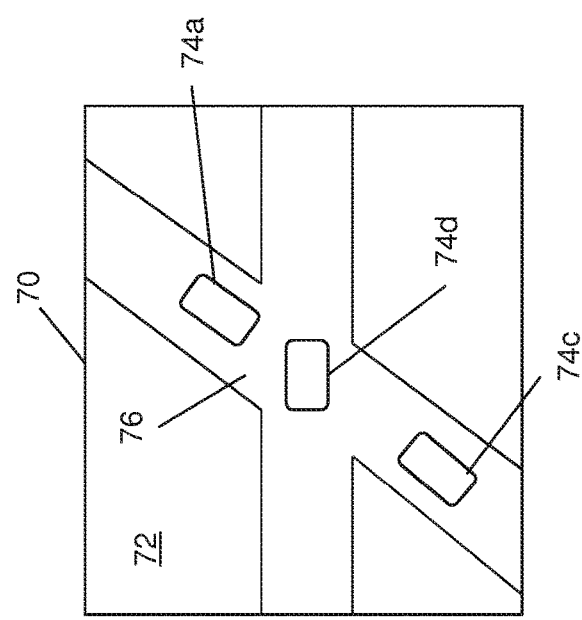
FIG. 6(b)

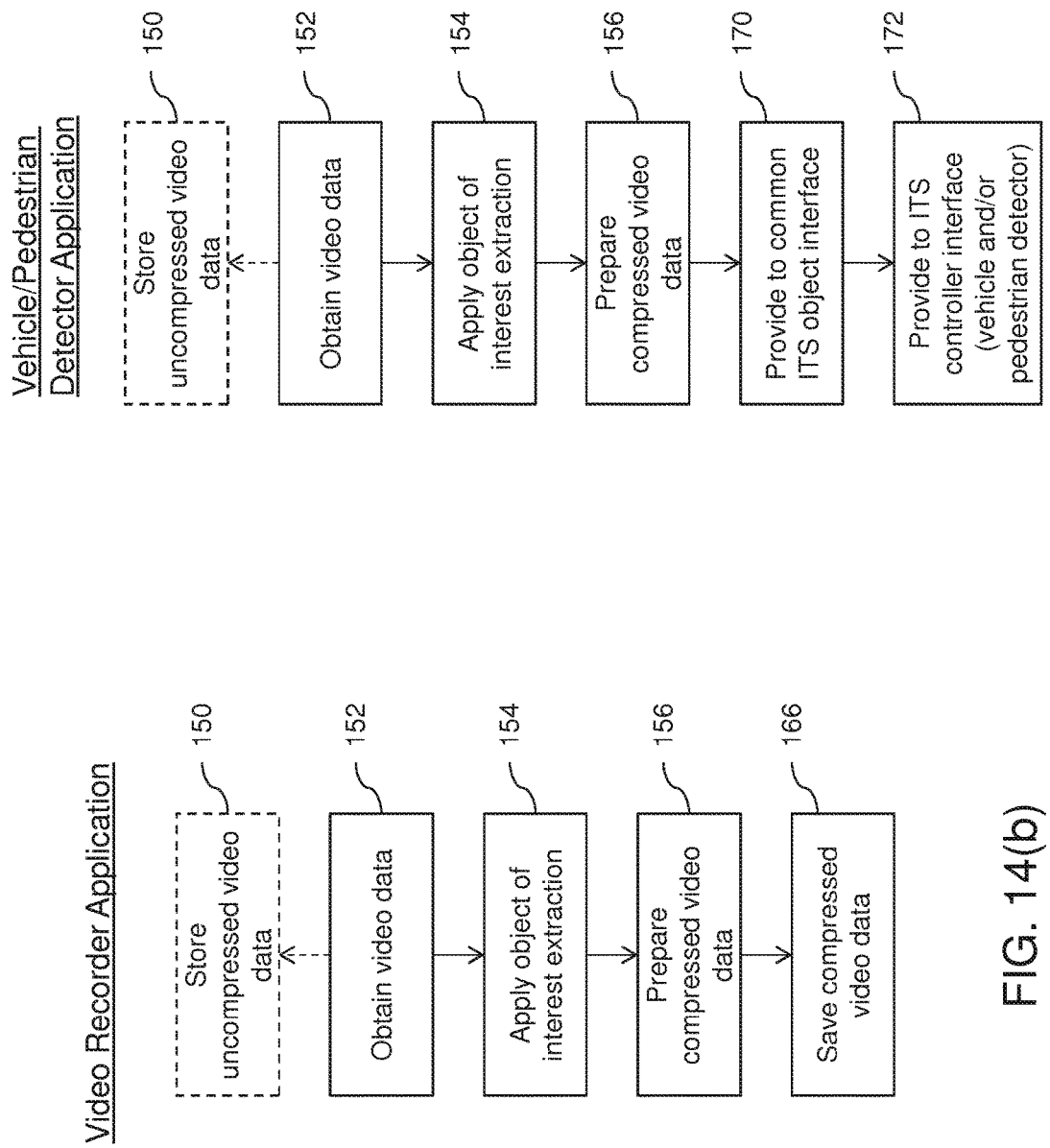

SYSTEM AND METHOD FOR COMPRESSING VIDEO DATA

This application claims priority to U.S. Provisional Application No. 62/091,951 filed on Dec. 15, 2014, the contents of which are incorporated herein by reference.

TECHNICAL FIELD

The following relates to systems and methods for compressing video data.

DESCRIPTION OF THE RELATED ART

There is a demand within the traffic industry for real time video transmission over wireless networks. Historically, the transportation engineering segment of the market have operated on offline data, but often require quick turnaround times on their traffic studies, e.g., often within a day). The intelligent traffic systems segment of the market operate advanced traffic management systems and typically require real time interaction with their network infrastructure. In both markets, video data, and the ability to transport such video data is important.

Current video encoding techniques are often unable to transmit video with a high enough level of quality and low enough bandwidth to make wireless video transmission practical, e.g., for remote processing. The encoder needs to preserve objects of interests for both human viewing and machine vision algorithms. For example, humans care about lighting, shading, geometry, and appearance, whereas machine vision algorithms rely on difference of intensities, background models, and object models; many pattern recognition algorithms care only about the response of an algorithm applied to an image and do not immediately operate on the image itself. If the target bandwidth constraints are enforced, a high video quality, as perceived by the human viewer, may be unacceptable for machine vision algorithms. Furthermore, when humans view traffic video they typically look for application dependent objects of interest, for example, they may want to determine if cars are flowing through an intersection and if they start to backup. In this case the ability to quickly estimate the length of a vehicle queue is considered more important than the surrounding environment.

On the other hand, achieving a suitable level of quality of the video for both humans and machine vision algorithms often imposes a significant bandwidth strain and introduces latency into any such video transmission system.

SUMMARY

In one aspect, there is provided a method of compressing video data, the method comprising: obtaining video data; extracting at least one object of interest from the video data using at least one classifier associated with at least one feature detectable in the video data; and preparing compressed video data comprising at least one object of interest extracted from the video data.

In other aspects, computer readable media, processing modules, video capture devices, and systems are provided that enable the performance of the above method.

BRIEF DESCRIPTION OF THE DRAWINGS

Embodiments will now be described by way of example, with reference to the appended drawings wherein:

FIG. 6(a) illustrates compression of a video frame to capture only objects of interest;

FIG. 6(b) illustrates compression of a video frame to capture objects of interest shown in FIG. 6(a) in a subsequent video frame;

FIG. 14(b) is a flow chart illustrating example computer executable instructions for obtaining, compressing, and storing video data in a video recorder application;

FIG. 14(c) is a flow chart illustrating computer executable instructions for obtaining, compressing, and providing compressed video to an Intelligent Transportation System (ITS) interface in a vehicle and/or pedestrian detector application;

DETAILED DESCRIPTION

To address the competing objectives of video quality and transmission bandwidth, it has been found that application specific video encoding algorithms can be created to enable machine quality data transmission at limited wireless bandwidths by extracting and encoding specific desired objects of interest from a video, based on the particular application in which the video is being used, while ignoring other data such as a static background that is not of interest to the end user. By processing only the objects of interest, bottlenecks between video-based traffic data transmission and processing using cloud- or other server-based distributed computing can be mitigated. Encoding only the objects of interest in a highly compressed stream reduces transmission costs and associated bandwidth, for both wired and mobile communications, allowing more videos and locations to be processed at a reduced cost. At the same time, reconstruction still allows users to visualize the entire scene of data, but contextual specific object encoding parameters allow the data stream to be useful in traffic related applications, such as vehicle, pedestrian, or bicycle metric studies or for vehicle detection applications to name a few.

Figure 1:
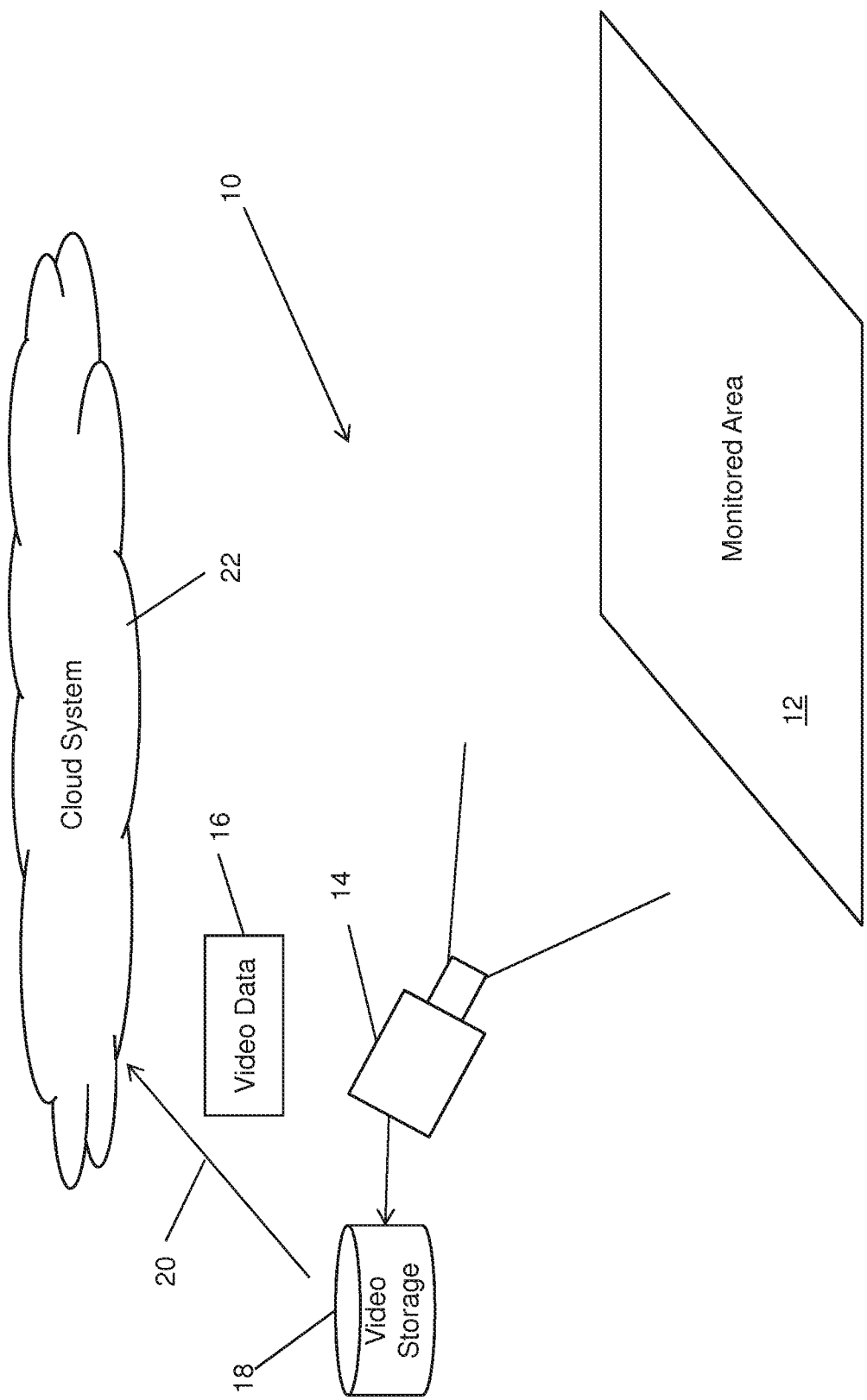
FIG. 1 is a schematic illustration of a monitored area being recorded by a video capture device.

Turning now to the figures, FIG. 1 illustrates a video monitoring system 10 for capturing video of a monitored area 12, e.g., a traffic intersection. A video capturing device 14, such as a camera, smart camera, etc., captures video to generate video data 16 associated with the monitored area 12. The video data 16 can be locally stored by the video capture device 14 (e.g., using an internal or externally coupled storage device). The video data 16 can also be transmitted over a communication channel 20 to a cloud system 22, e.g., a processing server, network infrastructure, etc. The communication channel 20 can be a wired, wireless, or manual delivery channel capable of transporting the video data 16 from the image capture device 14 to the cloud system 22 for subsequent usage and/or processing. For example, a cellular network can be used for wireless transmission, a fiber optic network can be used for wired transmission, and a portable media device (e.g., universal serial bus (USB) drive) can be used for manual transportation of the video data 16.

It can be appreciated that the principles discussed herein can be applied to the compression/encoding of video data 16 for the purpose of wireless transmission, data storage, or both wireless transmission and data storage wherein a reduction in size of the video data 16 enables efficiencies in any one or more of these scenarios.

Figure 2:
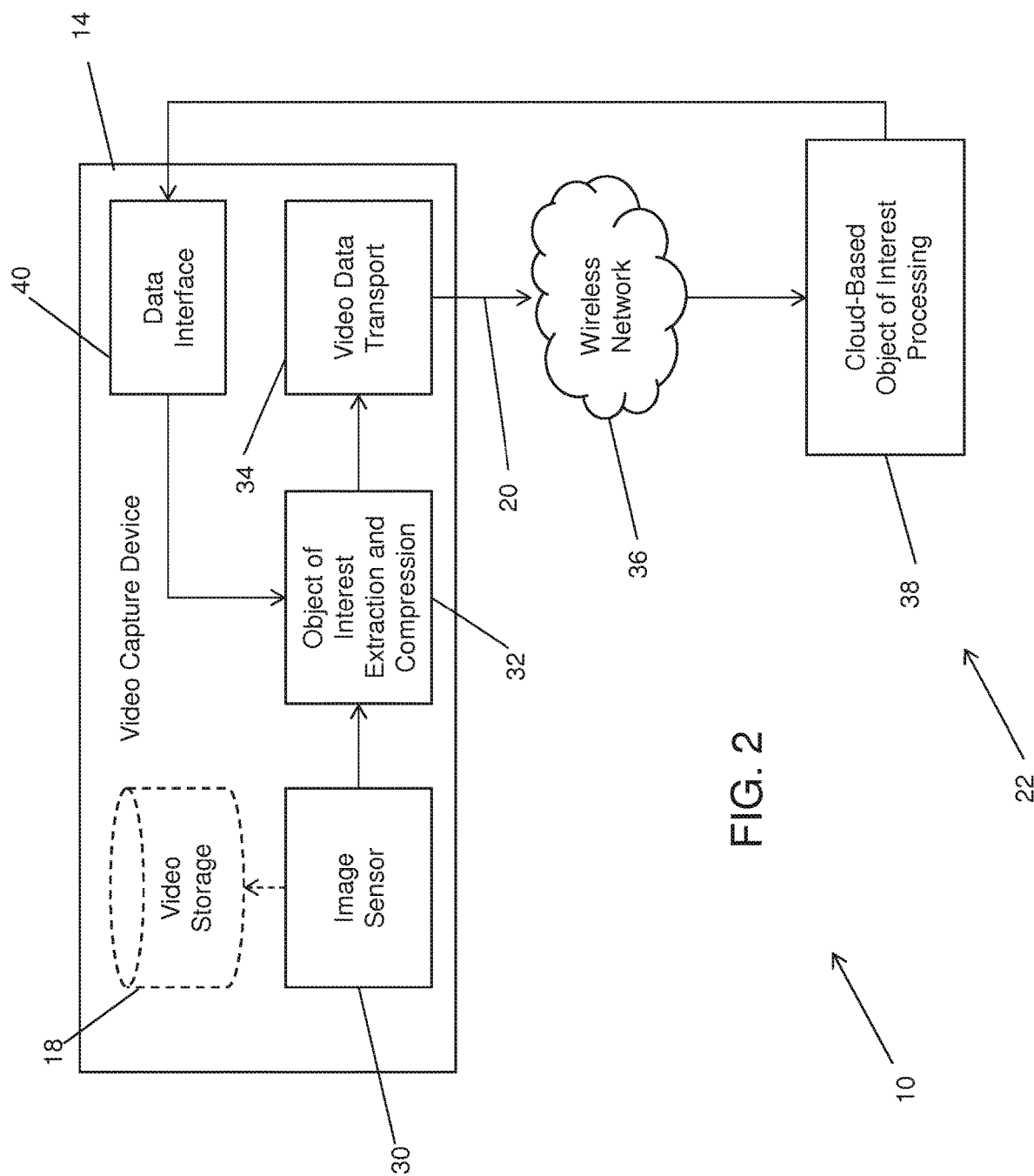
FIG. 2 is a schematic block diagram of a wireless video transmission system for processing compressed video data for cloud-based feature processing.

FIG. 2 illustrates an example of a configuration for the video capture device 14. In this example, the video capture device 14 includes an image sensor 30 for capturing a series of images to generate the frames of a video, and an object of interest extraction and compression module 32 for applying a customized machine vision algorithm to the captured video data 16 to generate compressed video data 16 based on objects of interest. An object of interest refers to an object that is encoded in the compressed video data 16. Feature extraction, classification, and a learning platform thereof, as discussed in greater detail below, provides a mechanism by which to detect an object of interest in video data 16. As discussed below, once detected, an object of interest is extracted and encoded with a desired level of detail. For example, the object's region may be down sampled and encoded using pixels to be reproduced by a human. The object may also be represented as a set of computer vision features or a mathematical parametric model, e.g., a sphere may be represented as a type of sphere, with a center and a radius, or a car may be represented as a type of passenger vehicle, with a center, a bounding box, a mean intensity, and even a vehicle make/model. The features are used to detect and classify the objects of interest, and may be used in their compression (or replaced with a model and set of parameters) and are encoded alongside the object of interest with enough information to reconstruct and visualize the object of interest.

It can be appreciated that the objects of interest can utilize an object of interest model, e.g., a codebook known by the encoder and decoder, wherein model parameters are encoded. The objects of interest can also use localizations, based on detections, which locate the objects of interest within a live or streaming video. The objects of interest can also use detectors, which use machine learning to detect objects of interest using features and classifiers and a learning system, as discussed below. A number of encoding methods can be used. For example, object of interest model encoding can be used to send model parameters to reconstruct a visual from a model type and the parameters. In another example, object of interest boundary encoding can be used with object detection and boundary creation that sends pixels and object features. In yet another example, region of interest encoding can be used, which is based primarily on pixels and appearance of objects, and involves cropping.

The object of interest extraction and compression module 32 can be implemented using hardware, software, or a combination thereof. The video capture device 14 also includes a video data transport module 34, e.g., a transmitter or transceiver capable of at least sending compressed video data 14 over a communication channel 20. In this example, the video data transport module 34 is configured to wirelessly transmit compressed video data 16 over a wireless network 36 such as a cellular network. The compressed video data 16 is received by a cloud-based feature processing device 38, such as a server and/or cloud service to utilize the compressed video data 16 in a particular application. It can be appreciated that the particular application can include only remote storage of the compressed video data in some implementations.

As shown in FIG. 2, the video capture device 14 can also include a data interface 40 for receiving communications and/or data from, among other things, the cloud-based feature processing device 38. It can be appreciated that the video data transport module 34 and data interface 40 are shown as separate components for illustrative purposes only and both modules and/or functionalities can be implemented using a single device, e.g., a transceiver configured to wirelessly transmit compressed video data and to wirelessly receive configuration or update data via one or more wireless networks 36.

Figure 3:
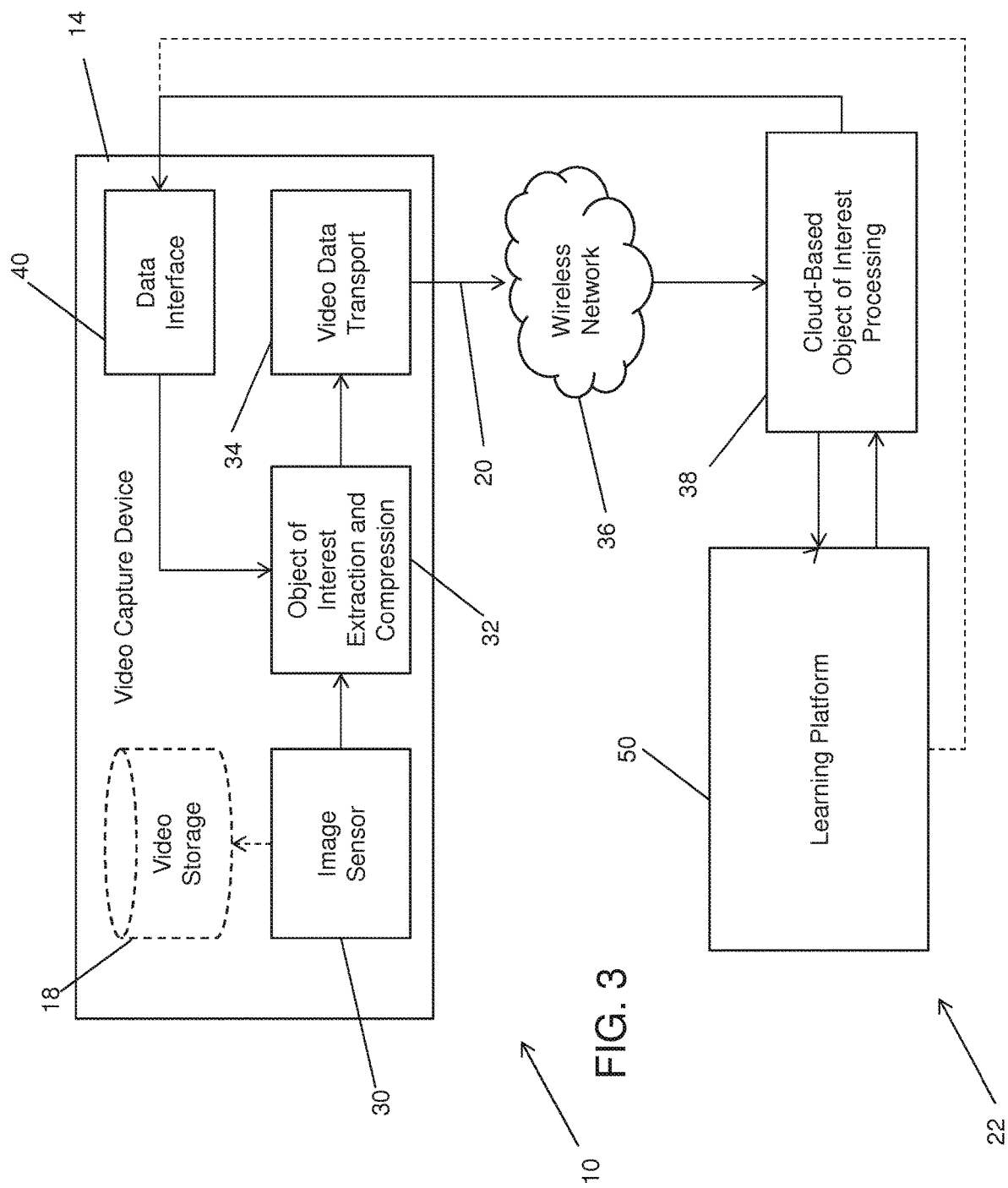
FIG. 3 is a schematic block diagram of a wireless video transmission system for processing compressed video data for cloud-based feature processing utilizing a learning platform to enable feature extraction and compression algorithms to be refined or updated.

FIG. 3 illustrates another configuration for the system 10, in which a learning platform 50 is utilized to have the object of interest extraction and compression module 32 updated and/or refined as new or refined classifiers are trained using the data collected from one or more video capture devices 14 in a connected system. Further details regarding such a learning platform can be found in co-pending U.S. Provisional Patent Application No. 61/014,898 entitled "Machine Learning Platform for Performing Large Scale Data Analytics" and filed on Jun. 20, 2014, the contents of which are incorporated herein by reference.

The learning platform 50 is used to take advantage of a validation stage in a traffic analytics system to provide meaningful data in a database for determining the accuracy of the classifiers used to correctly or incorrectly detect the object of interest. This meaningful data, processed on a large scale, allows the learning platform 50 to train the analysis system to which it is coupled towards better classifiers for the object being detected. Further detail regarding such a validation stage can be found within U.S. Pat. No. 8,204,955, the contents of which are incorporated herein by reference.

For example, when training a classifier to identify objects of interest within a video, a significant number (e.g., millions or billions) of features can be utilized as inputs into the large scale training infrastructure that could represent both spatial and temporal object characteristics, e.g. multi-scale spatiotemporal Haar features, along with billions to trillions of positive and negative object samples, from which the features are derived. The resulting classifier has parameters estimated from a larger sample size than is possible without a large scale learning infrastructure and consequently has increased accuracy at classifying similar objects, since more edge cases are used in learning. The resulting classifier may also have far fewer significant features required for classification as insignificant features can be discarded as part of the learning system, e.g. the learning infrastructure may reduce millions of arbitrary features to tens of useful features.

Figure 4C:
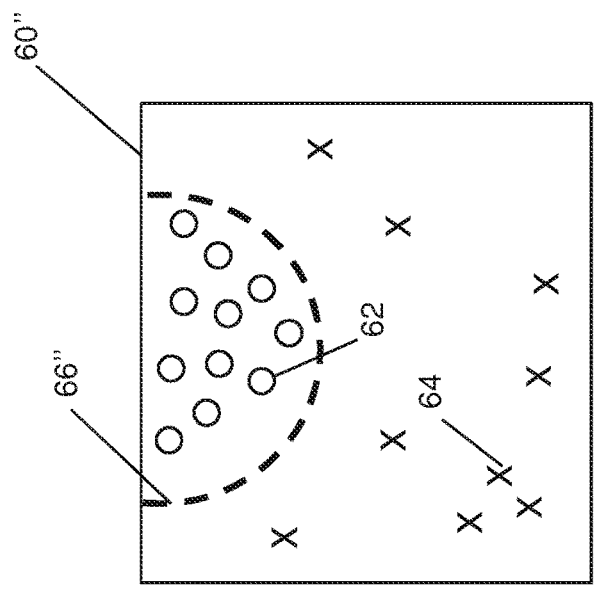
FIG. 4(c) illustrates an example threshold for classifying positive and negative samples.
Figure 4B:
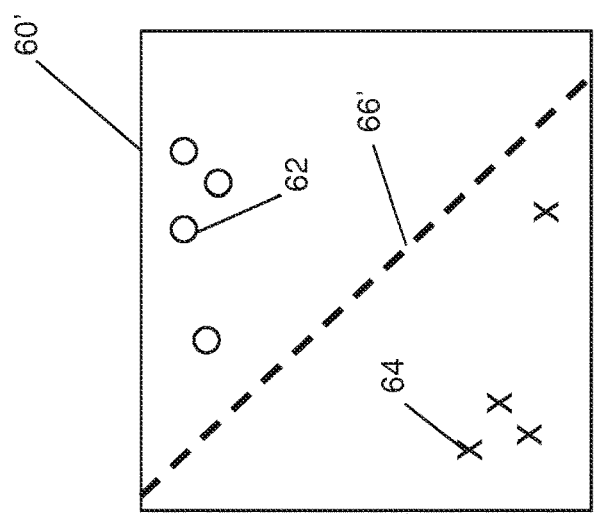
FIG. 4(b) illustrates an example threshold for classifying positive and negative samples.
Figure 4A:
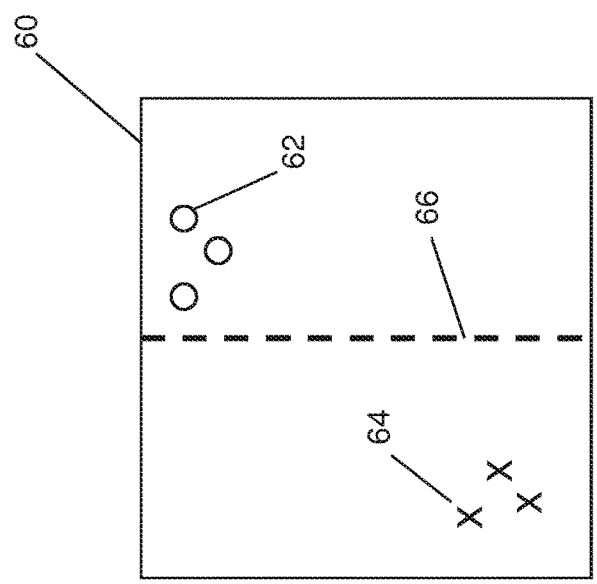
FIG. 4(a) illustrates an example threshold for classifying positive and negative samples.

FIG. 4(a), 4(b) and 4(c) illustrate a series of sample spaces 60, 60', 60" illustrating how a classifier can be trained to more accurately detect and classify an object of interest through the use of progressively more complicated features. For the purpose of this illustration, a single classifier can contain many discriminants, which can utilize one or more features. A classifier labels objects using features derived from object measurements. For example, a vehicle classifier, implemented using Adaboost (illustrated below), detects and labels vehicles using a sub-set of Haar features calculated from pixel intensities contained within an image sequence. In FIG. 4(a) to (c), the labels "x" and "o" represent two classes of objects. The features in FIG. 4(a) are classified according to the x coordinate, and in FIGS. 4(b) and (c), classified using the x and y coordinates. In FIG. 4(a), with relatively few positive samples 62 and relatively few negative samples 64, a one-dimensional linear threshold 66 could be selected since there is an area between the clusters of samples 62, 64 in which could represent a threshold boundary. However, as illustrated in FIG. 4(b), with additional positive samples 62 and negative samples 64, the one-dimensional threshold 66 would not have the same level of accuracy as in FIG. 4(a) and thus would need to be refined to generate a two-dimensional linear threshold 66' that would more accurately classify the set of samples. With even more samples, as shown in FIG. 4(c), a parabolic threshold 66' could be determined that can completely separate the negative samples 64 from the positive samples 62. As such, it can be appreciated that the thresholds used to determine positive from negative samples can be continuously refined through the addition of greater numbers of features and classifiers, in addition to evaluating more linear and non-linear combinations of features that generate more complex classifiers. In other words, object of interest detection accuracy can be improved through the use of more and better classifiers, which relies on having greater amounts of "truth" data in combination with the computational capabilities to perform machine learning on a significantly large amount of data.

Figure 5:
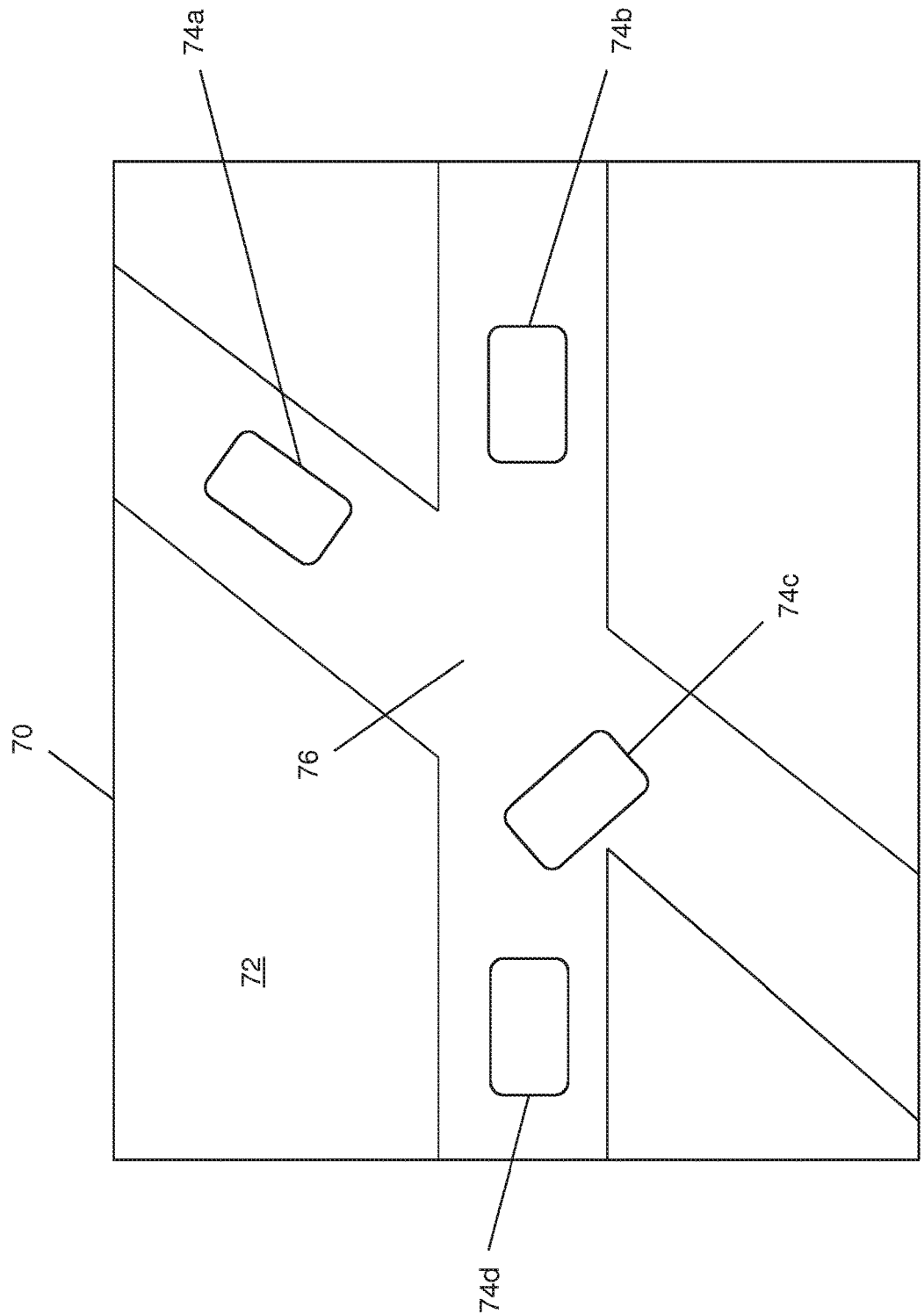
FIG. 5 illustrates a video frame including background objects and objects of interest.

Turning now to FIG. 5, an example of a video frame 70 is shown, which includes background data 72 and a series of features of interest 74a, 74b, 74c, and 74d, in this example being associated with vehicles moving through a traffic intersection 76, which is part of the background data 72. It has been found that for substantially static video (e.g., for a fixed or semi-permanent video camera installation), much of the background data 72 remains consistent, or experiences little change, at least during particular periods of time. On the other hand, there are particular features that are of interest in the particular application in which the video capture device 14 is being used. For example, in a vehicle count application, the number of vehicles that move through the intersection 76 are of interest, and not necessarily movements that are not on the roadway of the intersection 76. To reduce the size of the video data 16, the video data 16 is compressed to include only data concerning the features of interest, while in at least some data transmissions, the background data 72 is ignored or otherwise assumed to be static or rarely changing. In this way, significant amounts of video data can be eliminated from the wirelessly transmitted and/or stored video data 16 with the associated advantages of reduced bandwidth and storage requirements. The background data 72 can still be updated, but this can be done on a periodic basis instead of in real time. For example, the background data 72 can be transported early in a traffic study and reused at the server side to reduce the amount of video data 16 that is transmitted throughout the study.

FIGS. 6(a) and (b) illustrate an example in which the four vehicles 74a-74d that are extracted using the machine vision algorithm constitute the primary data to be transported in the compressed video frame 80 at time (a) in FIG. 6(a), with only the three remaining vehicles that are extracted (namely 74a, 74c, and 74d) constitute the primary data to be transported in the compressed video frame 80 at time (b) in FIG. 6(b). It can be appreciated from FIGS. 6(a) and (b) that by focusing on the desired features of interest for the particular application while ignoring background data that may change but is not of interest, the amount of data that is required to be transmitted in order to shown how the video data 16 changes from frame to frame is greatly reduced.

For a vehicle detection application of intelligent traffic video, object of interest encoding can obtain compression of at least 5 to 15 times that of H.264. The most conservative application can obtain 5 times compression compared to H.264, by dynamically cropping the raw video to only include a region of interest that contains the objects of interest. A vehicle detector can identify the dynamic flow of traffic and the encoder can include only regions that contain moving vehicles, encoding only the roadway for this case. Since approximately ⅕ of the ITS video contains roadways, a compression ratio of 5 is obtainable.

A moderate compression ratio of 10 is achievable by encoding only the pixels associated with the objects of interest, instead of also encoding the surrounding region. A high resolution background model can be encoded sparsely, while dynamic moving vehicles can be detected and everything within their object boundaries can be encoded. Based on the scale of vehicles compared to other objects in the ITS video, vehicles tend to occupy, on average, about ⅒ of the video frame, yielding approximately 10 times compression.

Higher compression ratios of 15 times and more can be obtained using object models. Instead of encoding an object boundary and the contained pixel intensities, the object can be modelled and expressed through several parameters. For instance, a vehicle can be compressed as 10 to 100 parameters that can be later mathematically reconstructed for visualization and for computer vision applications. The limited number of parameters requires less bandwidth than sending an entire region of interest full of pixel intensity values. Thus, a compression ratio of 15 times H.264 or more is achievable using an object modelling method. In theory, if only an object type and a position are encoded, compression of 3,000 times is possible. Both the encoder and decoder contain application specific object of interest models, allowing the encoder to estimate the model parameters and the decoder to reconstruct an object from the model.

The encoding scheme can allow lossless data when encoding the surrounding region of interest, or it can variably allow lossy compression if the application is, for example, simply measuring properties of a vehicle with an approximate appearance found to be a sufficient representation for an object of interest.

The objects are encoded using the following mathematical concepts. First an object of interest detector, $d_c$, is configured such that if an object of interest, of class type c, is located at (x, y), $d_c(x, y) \approx 1$, and if objects of interest are not present at (x, y), $d_c(x, y) \approx -1$. The detectors contain pattern recognition algorithms that locate objects of interest of a specified class. Machine learning methods, such as those contained in co-pending PCT Patent Application No. PCT/CA2015/050558 (entitled "Machine Learning Platform for Performing Large Scale Data Analytics" and filed on Jun. 18, 2015), can be used to train parameters of the object of interest detectors. For instance, $d_c$, might contain Haar features and a collection of linear discriminant classifiers trained using Adaboost. The machine learning methods can be extended to any known classifier.

Once a detector processes each pixel coordinate, (x, y), regions that have a response greater than a specified threshold, e.g. $d_c(x, y) > \tau_c$, contain objects of interest of class type c. Regions of these high detector responses can be clustered and segmented using computer vision techniques, such as K-means, Nearest Neighbour, or other centroid/density/distribution clustering techniques, to isolate objects of interest. Then, object of interest properties, $\theta_i$, can be calculated using each object's known position. These properties may include average intensity, variance of intensity, center of mass, object boundary, and basis transformation results, etc. For instance, an image region I, can be transformed using a non-linear transformation $\Phi(I)$, into an ordered set of basis transformation parameters, $\vec{\theta}$, where, $\vec{\theta} = \Phi(I)$ and $I \approx \Phi^{-1}(\vec{\theta})$.

It may be noted that while an inverse transformation $\Phi^{-1}(\vec{\theta})$ may exist; it is not always necessary or desirable to have a lossless transformation. Often, the parameters, $\vec{\theta}$, themselves may be useful for computer vision applications. For instance, suppose that for vehicle detection applications, $\vec{\theta} \supseteq \{x, y\}$.

Having knowledge that the vehicle's centroid is located at {x, y} allows traffic metrics to be collected without the need to reconstruct the vehicle appearance represented in I. However, if the application were instead to preview hundreds of intersections simultaneously, $\Phi^{-1}(\vec{\theta})$ could generate an approximate appearance of the vehicle, typically but necessarily a lower resolution. The application determines which parameters are most useful and the form of the basis transformation.

For traffic related video $\vec{\theta}$, can contain (a) motion information obtained from optical flow and other flow field analysis, (b) a set of homogenous intensity regions that when combined represent the all the regions occupied by the object of interest, (c) the class type of the object (vehicle, pedestrian, bicycle, etc.), and (d) a sub-classification of the object, such as vehicle brand or model.

The function $\Phi(I)$ incorporate existing computer vision compression techniques, such as compressive sensing or JPEG compression, but can be extended to include application specific properties to reduce the need for highly accurate and more expensive appearance information, e.g. vehicle centroid, vehicle model, or vehicle speed, instead of sending all the pixels at sufficient quality required to infer that information after decoding the video stream. This method allows for very high resolution sensors to be used for initial object property extraction and eliminates the need to transfer the memory intensive pixel map beyond the encoder.

For traffic related video, objects in the video can be decomposed into three categories: (i) static background ($c_{static}$), (ii) dynamic background ($c_{dynamic}$), and (iii) vehicles ($c_{vehicle}$), pedestrians ($c_{ped}$), and bicycles ($c_{bicycle}$). For traffic analytic applications, only $c_{vehicle}$, $c_{ped}$, $c_{cycle}$ classes represent objects of interest. The backgrounds, $c_{static}$, and $c_{dynamic}$, are not required can be excluded from the video encoder. If the application requires human visualization, then $c_{static}$ can be represented as a high resolution texture map, and $c_{dynamic}$ be replaced with a high resolution static texture map, $I_{static,hi-res}$, that is encoded only once and $c_{dynamic}$ can be replaced with medium to high resolution texture maps that are encoded with a period sufficient to satisfy user requirements for the scene. For instance, a background containing moving trees can be updated every few minutes without lose, while a background containing a rotating advertisement billboard may be updated each time the advertisement changes, if the user requires to visualize the current advertisement associated with traffic density. The decoder can then reconstruct the video using $\Phi_c^{-1}(\vec{\theta}_i)$, for each object of interest, i, associated with a corresponding object class, c.

Figure 7:
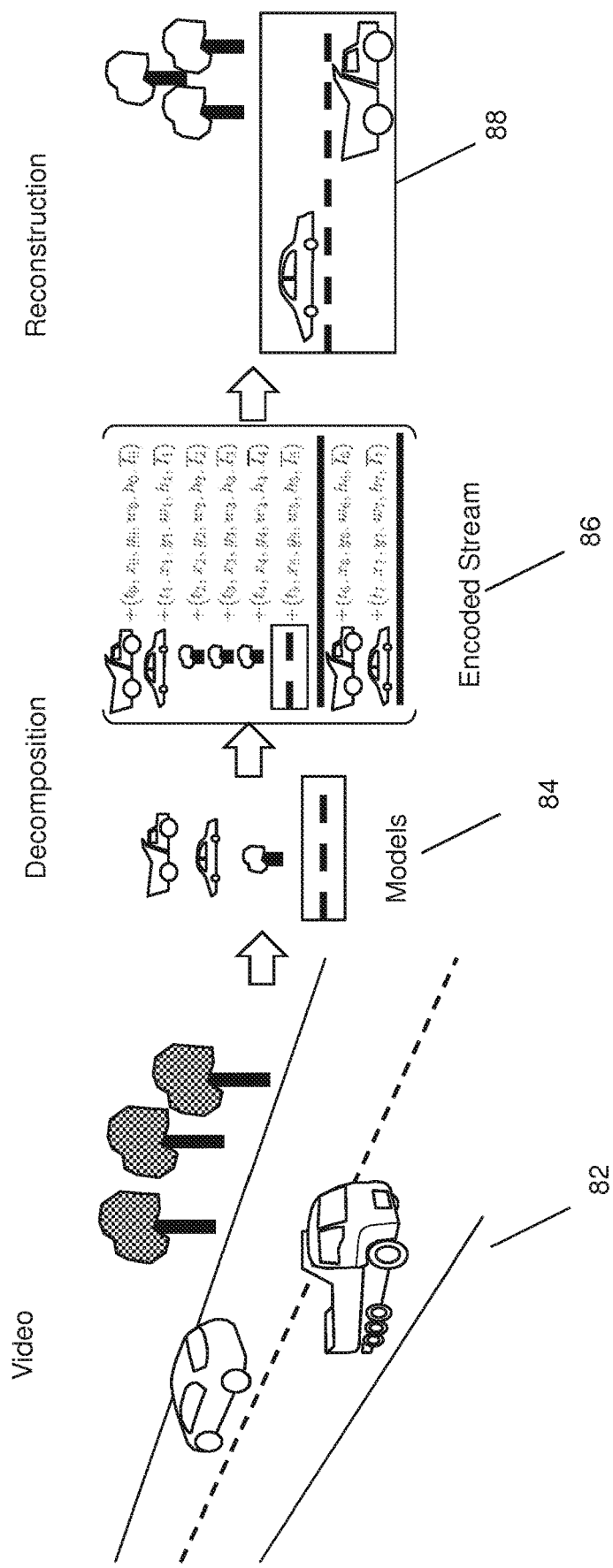
FIG. 7 is a schematic diagram illustrating a decomposition of a video.

FIG. 7 illustrates a video decomposition method in which a video frame 82 is decomposed using models 84 associated with objects of interest. The models are encoded into the video stream 86 and contain parameters that identify where the objects of interest are in the scene, as well as pixel intensity and colour, etc. The encoded stream 86 is transmitted or transported to another entity such that a reconstruction 88 of the video frame 82 can be generated.

Figure 8:
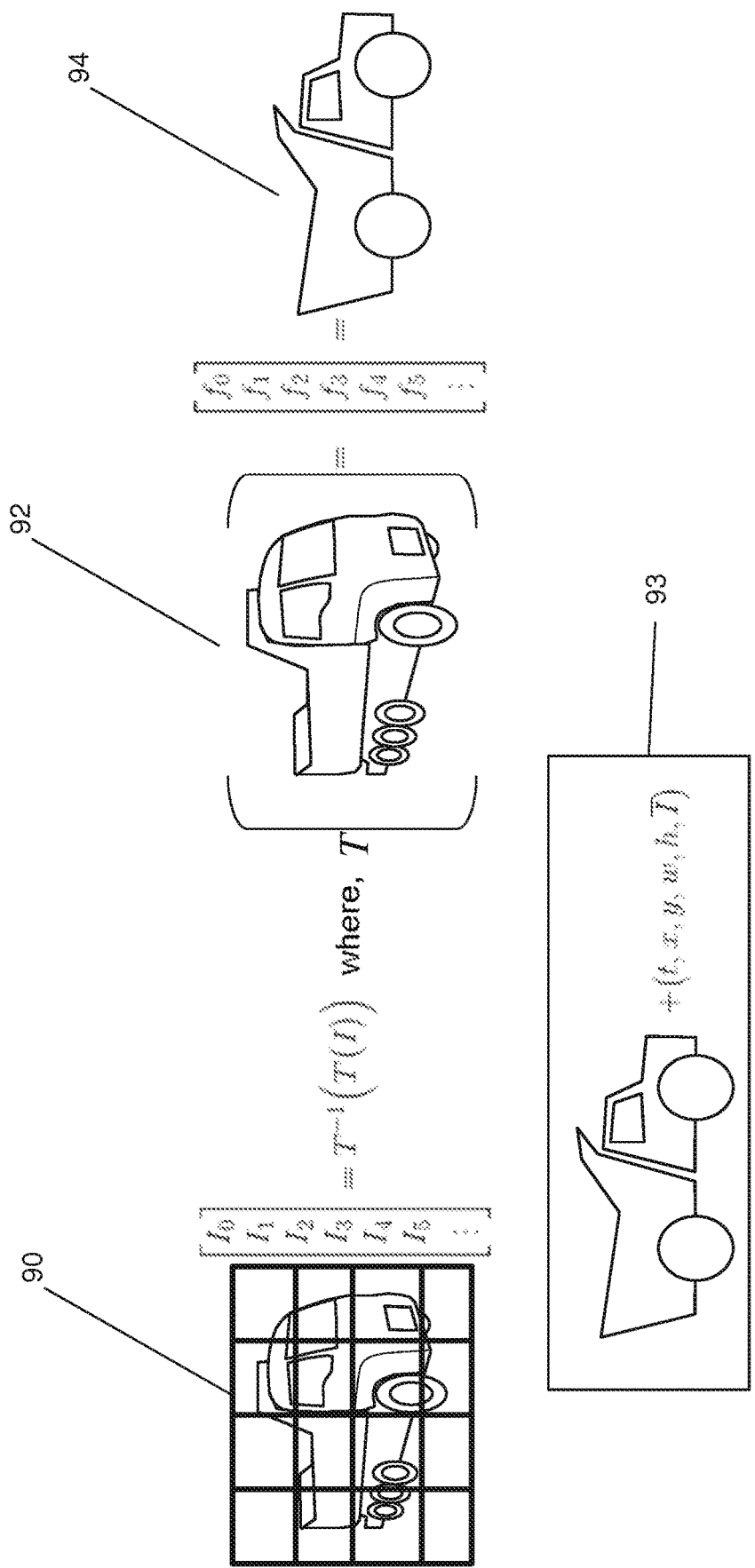
FIG. 8 is a schematic diagram illustrating a model-based representation of an object in a video.

FIG. 8 illustrates a model based representation of an object of interest. The object is initially contained in an image and is represented as a set of pixels 90. The pixels, I, are transformed using, $\Phi(I)$, into a the parameter vector, $\bar{\theta}$ in 92. The model and parameters, represented by the icon 94, can be transformed, for example by a translation, scale, and illumination changes as shown in 93.

Figure 9A:
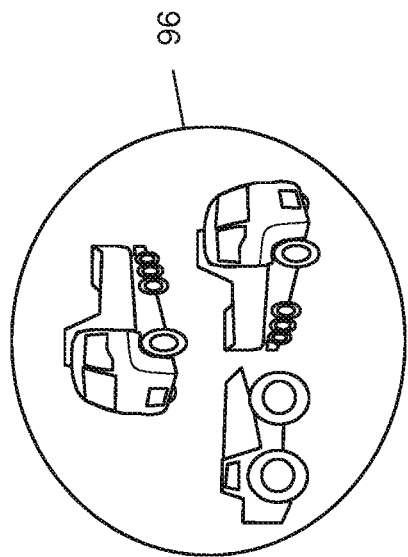
FIG. 9(a) is a schematic diagram illustrating a basis minimizing intra-class variability.

FIG. 9(a) illustrates one challenge with the decomposition process, namely determining a basis that minimizes intra-class variability. As shown in the diagram in FIG. 9(a), a representative object encoder model should be able to model vehicles within the same type of class. The distance between objects of the same class when measured in the transformed basis domain should be minimal.

Figure 9B:
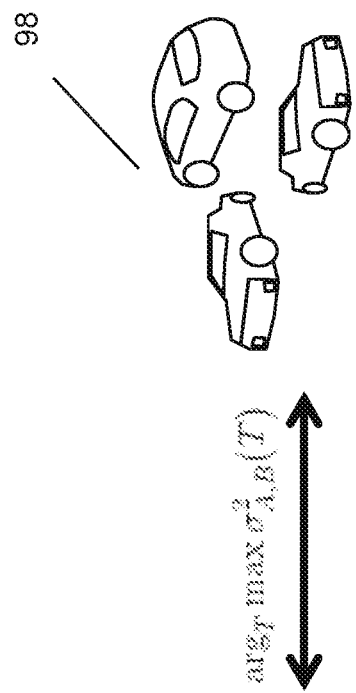
FIG. 9(b) is a schematic diagram illustrating a basis maximizing inter-class variability.

FIG. 9(b) illustrates another decomposition challenge, namely maximizing inter-class variability. As shown in the diagram in FIG. 9(b), an object of interest encoder model should ensure that object class types, other than the desired class, are distinct from objects of the desired class type. For example, 96, a class of trucks, is distinct from 98, a class of passenger vehicles. The basis transformation should separate different classes into distinct clusters to avoid confusing passenger vehicles with trucks.

A good basis transformation should create a high dimensional space in which objects of the same class are tightly clustered and objects from different classes are as far as part as possible. This allows the machine intelligence to be part of the encoder process and ensures that objects are assigned and encoded to the correct model class. It is possible for objects to be encoded to multiple models if the class assignment is uncertain, and the encoder would simply include the model assignment confidence as part of the encoding process. Ideally, high confidence can be obtained through basis selection according to FIG. 9.

Figure 10:
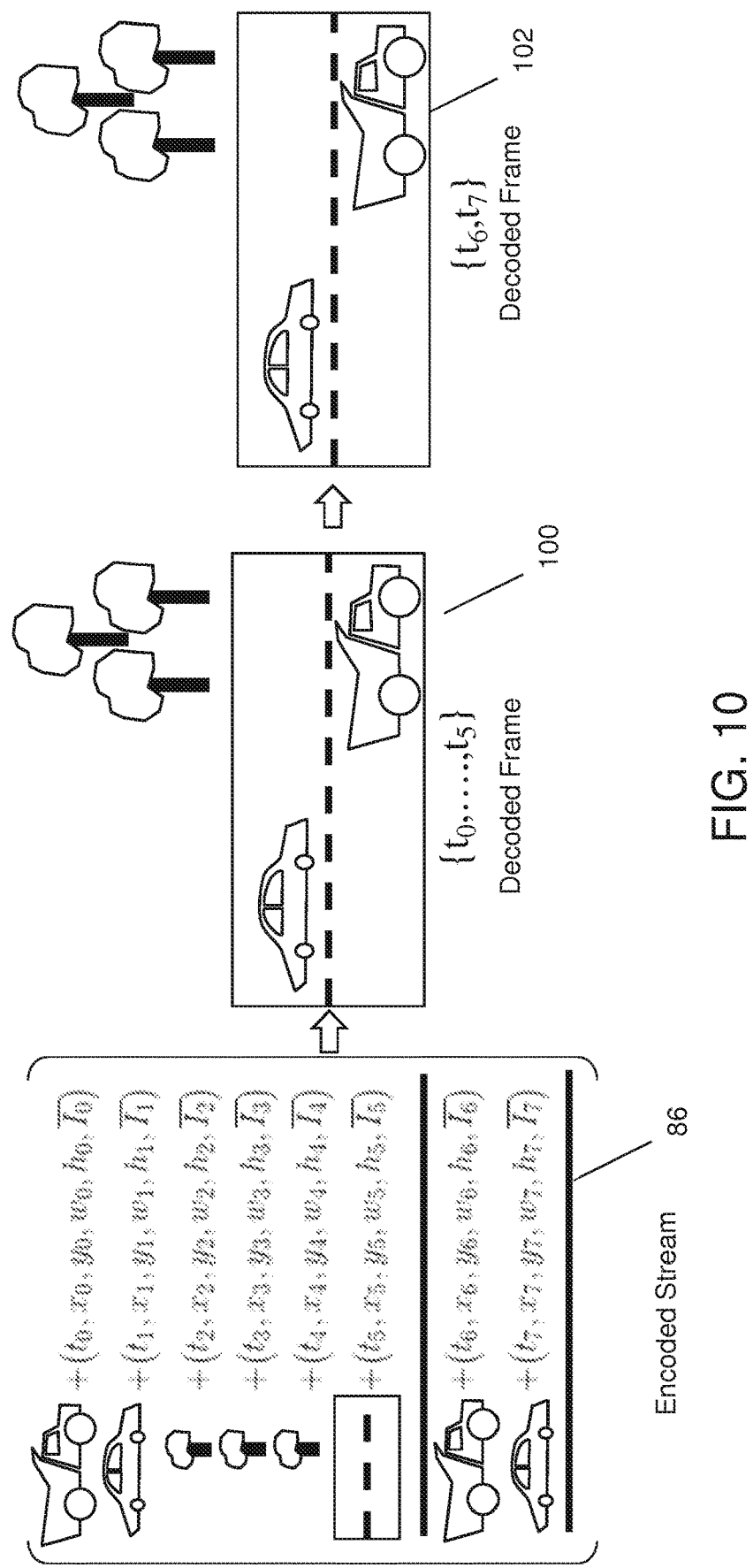
FIG. 10 is a schematic diagram illustrating a reconstruction of an encoded data stream to generate a decoded video frame.

FIG. 10 illustrates a reconstruction, wherein an encoded stream 86 comprising a number of models for objects of interest is converted into a sequence of object parameters and positions. For example, objects of interest at time $t_0$ are represented at in frame 100. As time increases the static background objects are not re-encoded, but the dynamic objects, vehicles, are transformed to a new position and scale at time $t_0$, at 102. The decoder can generate interpolated object parameters from times $t_1 \ldots t_5$. The decoder can either create a human viewable image frames, or can also simply create parameters of objects that can be used for ITS applications without the need to generate visualization.

Figure 11:
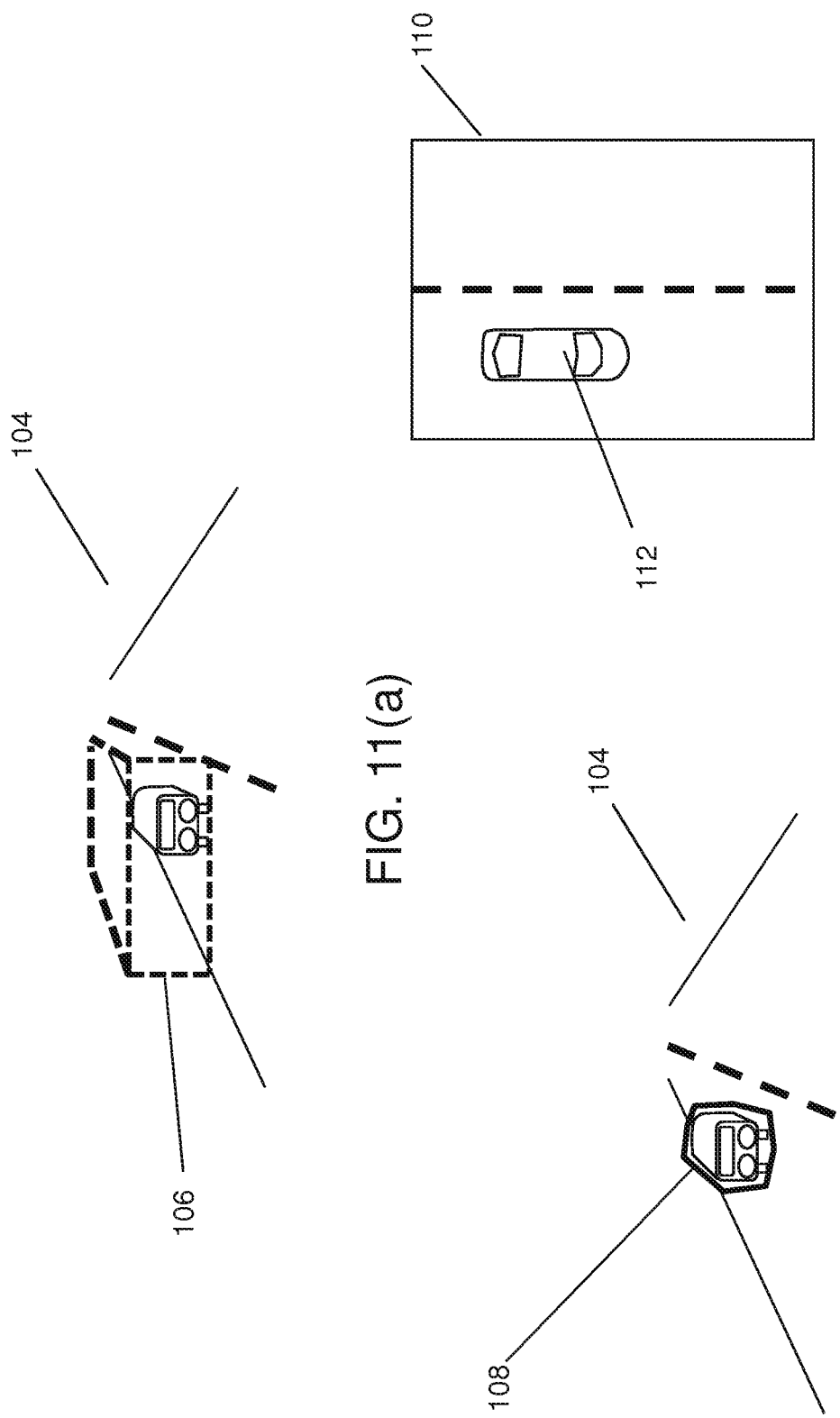
FIG. 11(a) illustrates a detection zone for a region of interest (ROI) encoding method.
FIG. 11(b) illustrates an object of interest boundary encoding method.
FIG. 11(c) illustrates an object of interest model encoding method.

FIG. 11 illustrates example encoding methods that can be used for an example video frame 104. In FIG. 11(a) an ROI encoding method is illustrated wherein a detection zone 106 is encoded as well as the appearance of the zone. Anything contained within the ROI, 106, is encoded. This process may only encode image appearance properties such as intensities at every pixel. Since the detection zone is smaller than the video, encoding only in dynamic ROIs, bandwidth savings can be obtained. The encoder can also include any additional parameters of the ROI, such as a detection signal to indicate if one or more vehicles are in the zone. As an application, the decoder can then search the video stream and present only image sequences when a vehicle is present. Optionally, the encoder can only transmit the ROI if one or more vehicles are present.

FIG. 11(b) illustrates object of interest boundary encoding which encodes a timestamp, boundary, and a mean intensity. Using an object of interest detector and object boundary localization methods, only the object boundaries and their contents are encoded, further reducing bandwidth. In 108, it is possible to encode all of the pixel intensities within the object boundary for human playback, and it is also possible to provide additional meaningful object parameters, such as vehicle class, in the encoded stream.

FIG. 11(c) illustrates an object of interest model encoding method which encode both a parametric appearance and positional object of interest encoding model. Unlike FIG. 11(a) and FIG. 11(b), 112 is represented as a parametric vector with a model instead of raw pixel intensities. Significant bandwidth savings and useful applications can be obtained at this stage since the encoder has a clean vector of meaningful parameters. The decoder is no longer required to parse any of the pixel intensity values and can instead perform reconstructions using a vehicle's make and model. The parameter vector can be as simple as vehicle make, model, and position at a given time or as complicated as a set of appearance properties sufficient to perform a realistic 3d model in a simulated graphics rendering engine for human visualization.

Figure 12:
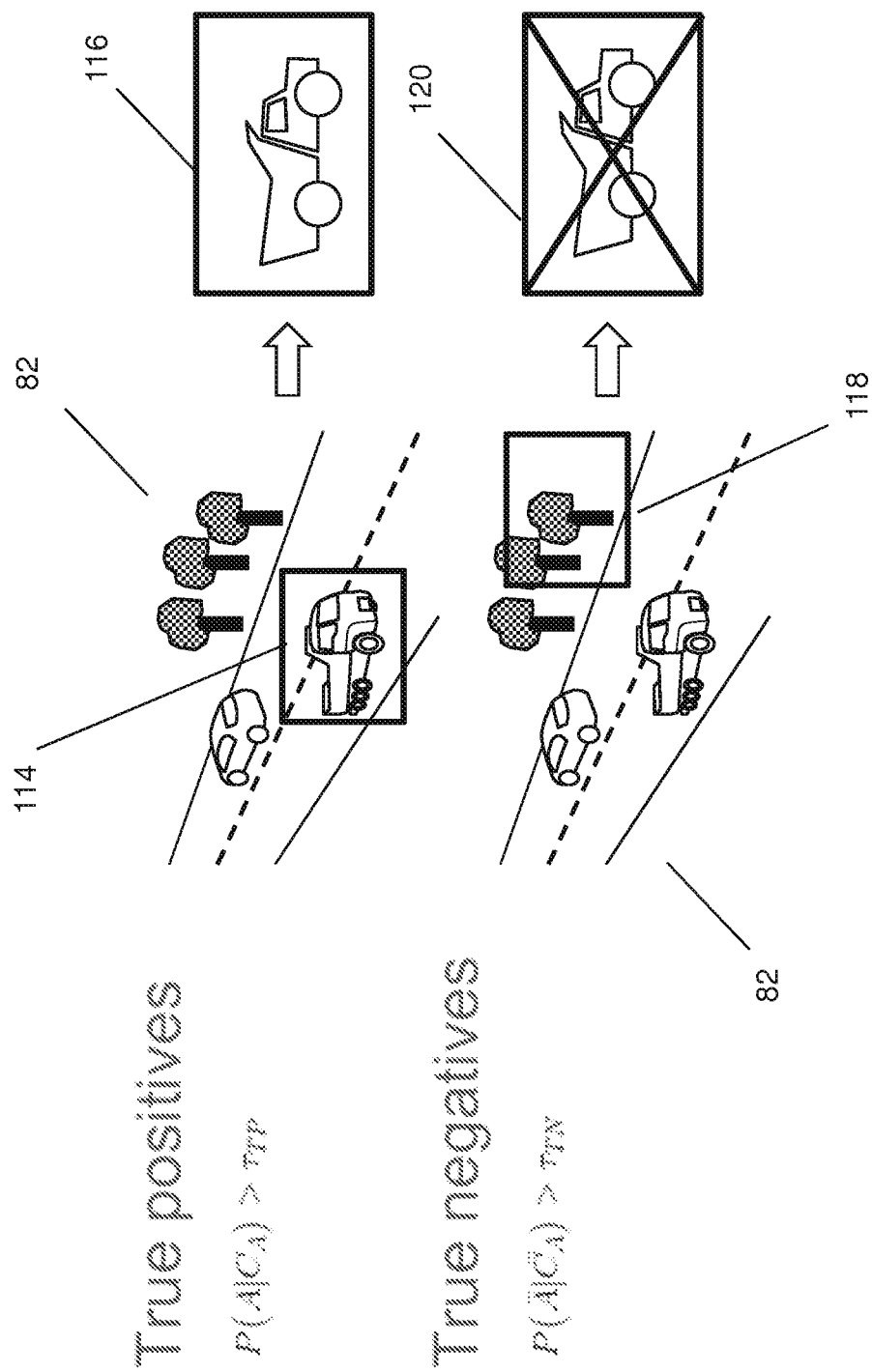
FIG. 12 is a schematic diagram illustrating true positives and true negatives in object of interest detection.
Figure 13:
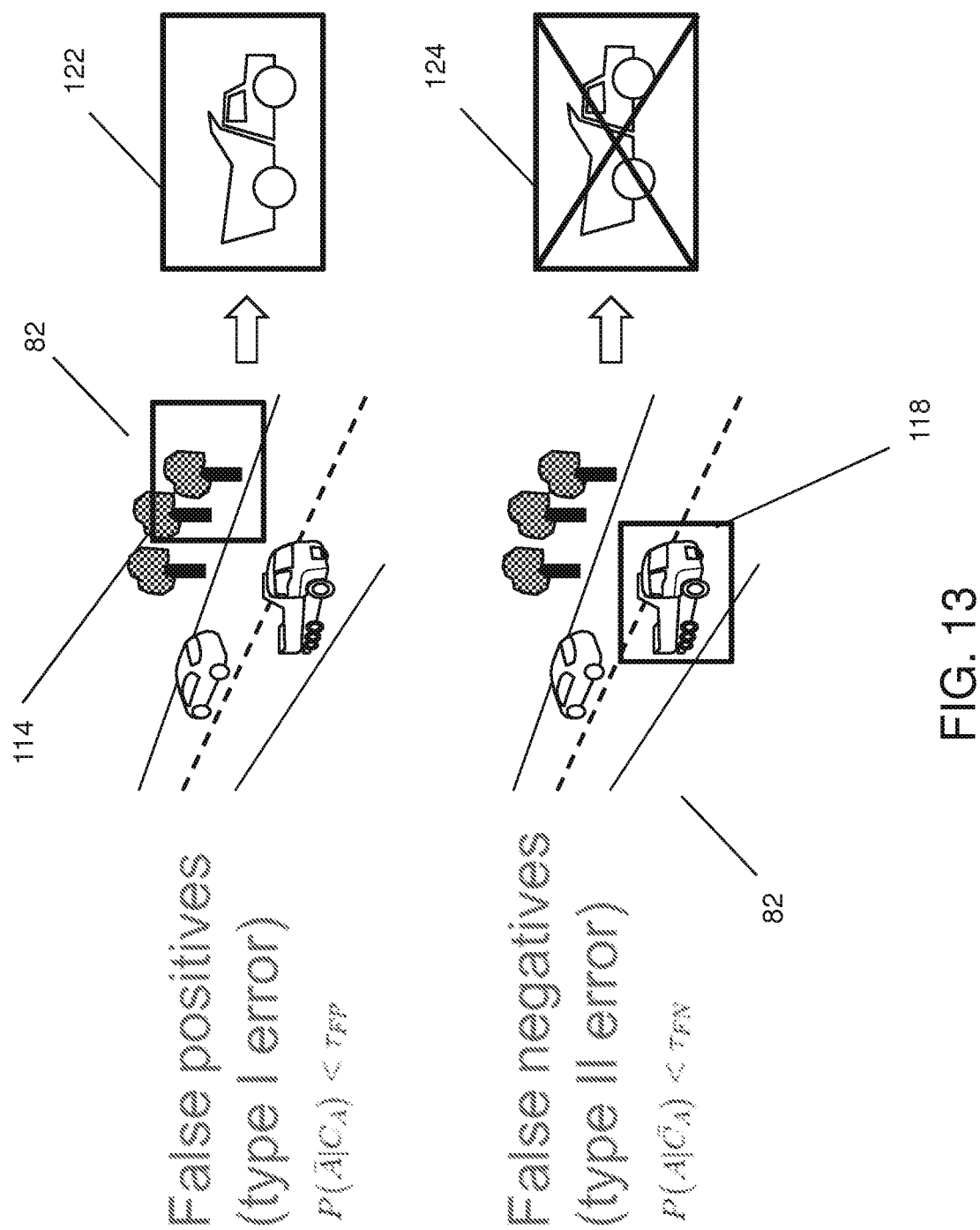
FIG. 13 is a schematic diagram illustrating false positives and false negatives in object of interest detection.

The goal of the encoder is to maximize true positives and true negatives while reducing false positives and false negatives. FIG. 12 illustrates true positives and true negatives while FIG. 13 illustrates false positives and false negatives. More weight might be applied at reducing false negatives to ensure that the encoder does not miss vehicles. Reducing false positives is more of a criteria since having fewer false positives ensures that non-objects of interest are not encoded, and can lead to bandwidth savings.

Figure 14A:
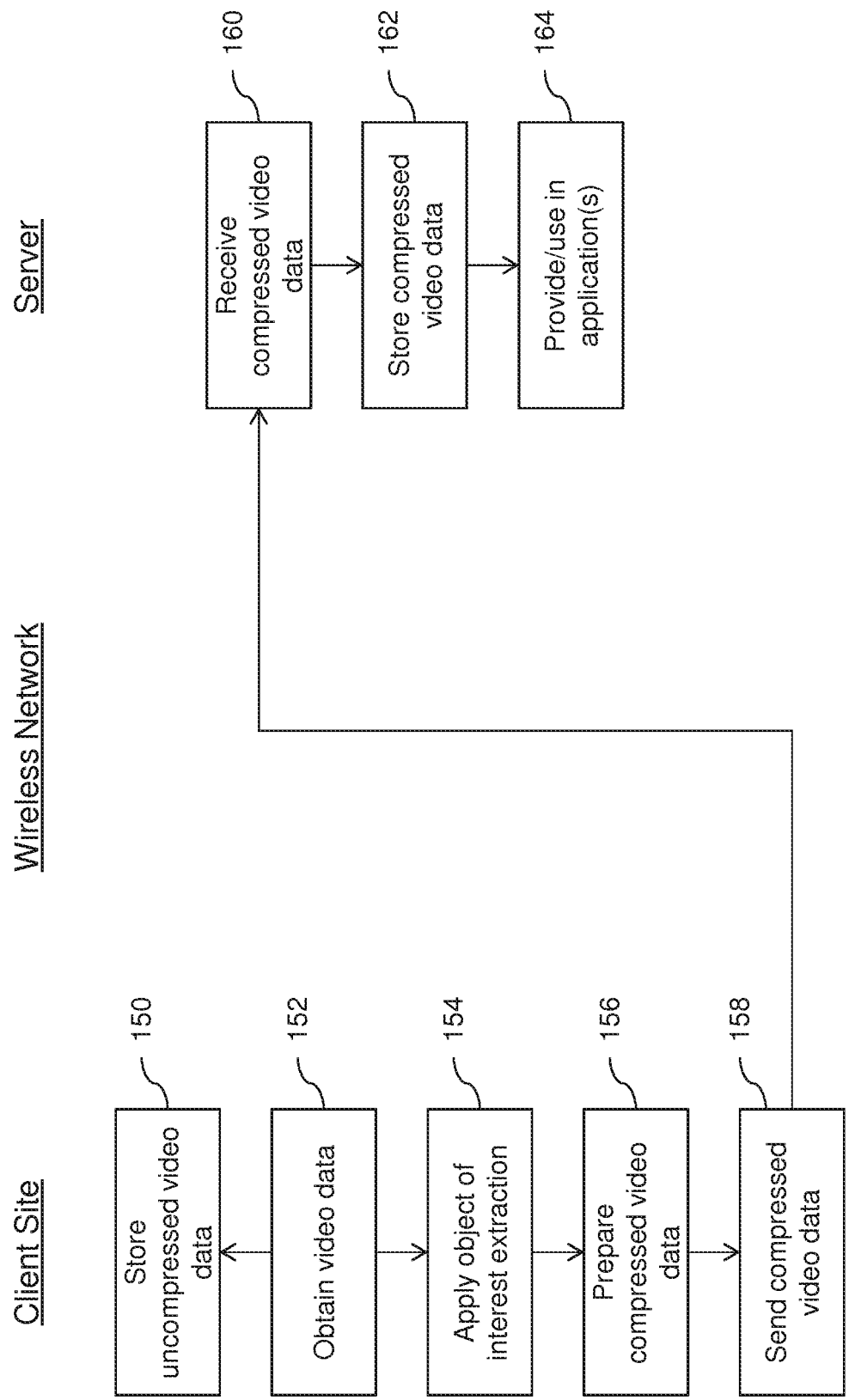
FIG. 14(a) is a flow chart illustrating example computer executable instructions for obtaining, compressing and wirelessly transmitting video data.

Turning now to FIG. 14(a), a flow chart is provided, which illustrates example computer executable instructions that may be executed within the system 10 for obtaining, compressing and wirelessly transmitting video data 16. At 152 video data 16 associated with a monitored area 12 is obtained at the client site by a video capture device 14. The video data 16 can be stored in an uncompressed form at 150, e.g., using an internal local storage device or portable storage device. The object of interest extraction and compression module 32 is used at 154 to apply object of interest extraction by operating an application-specific machine vision algorithm and at 156 to prepare compressed video data 16. The compressed video data 16 includes specific information associated with particular objects of interest that are detected in the video data 16 obtained at 152, thus reducing the size of the video data that is sent at 158 over the wireless network 36 to a server entity, such as the cloud-based object of interest processing device 38. In this example, the cloud-based object of interest processing device 38 receives the compressed video data 16 at 160 and stores the compressed video data 16 at 162. The compressed video data 16 can then be used in a particular application at 164, e.g., to perform a vehicle counting operation based on the objects of interest extracted at the client site and included in the compressed video data 16.

FIG. 14(b) illustrates another example in which video is recorded but not necessarily transmitted or transported as illustrated in FIG. 14(a). At 152 video data 16 is obtained, which can be optionally stored in an uncompressed format at 150. The object of interest extraction method(s) are then applied at 154 and compressed video data 16 is prepared at 156, similar to what is shown in FIG. 14(a). However, in this example, the compressed video data 16 is saved at 166. In another example, shown in FIG. 14(c), steps 150-156 are also performed as shown in FIG. 14(a), however, the compressed video data 16 is provided to a common intelligent traffic system (ITS) object interface at 170, in order to provide the compressed video data 16 to an ITS controller interface at 172 for performing vehicle and/or pedestrian detection. For example, a municipality can store compressed video at the intersection allowing them to recall historical vehicle movements and corresponding intersection signal states. Using vehicle encoding, operators can search the encoded stream for presence of vehicles, pedestrians, or bicycles and can query for specified traffic density patterns or potential collisions due to poor timing designs. The encoded streams can be structured to allow easy recall of traffic signal states, such as flashing red lights. Further the compressed size allows a large amount of history to be stored on site if video is not stored remotely.

Figure 15:
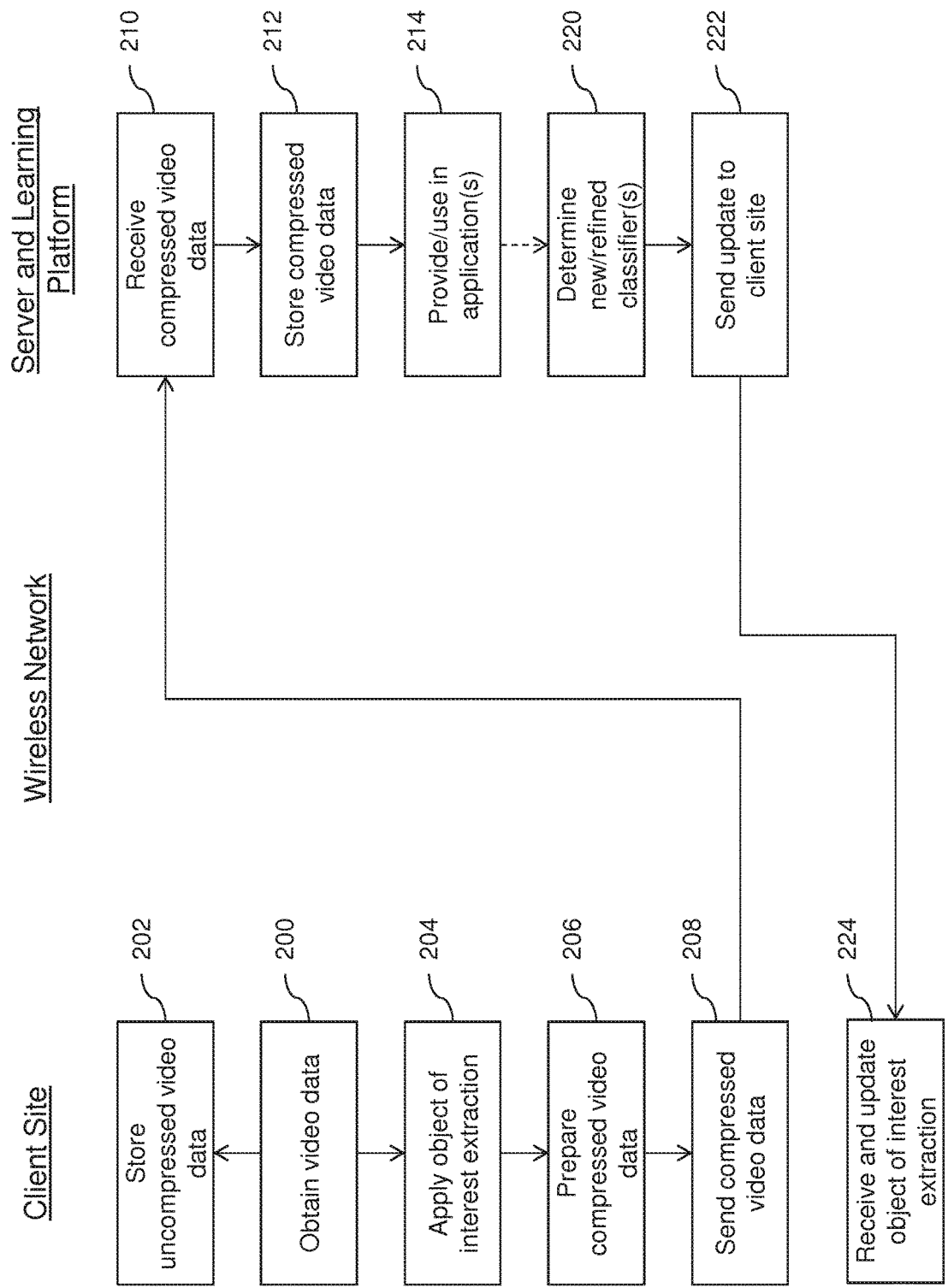
FIG. 15 is a flow chart illustrating example computer executable instructions for obtaining, compressing, and wirelessly transmitting video data, and updating a client site using information determined by a learning platform.

FIG. 15 is a flow chart illustrating example computer executable instructions that may be executed for obtaining, compressing, and wirelessly transmitting video data, and updating a client site using information determined by a learning platform. As can be appreciated, operations 200-214 in FIG. 14 are similar to those shown in FIG. 14 and therefore details thereof need not be repeated. When operating in tandem with a learning platform 50, the results or outputs of the processing performed by the cloud-based feature processing device 38 can be utilized by the learning platform 50 to determine new/refined classifiers at 220, e.g., as discussed above. In this way, the communication connectivity between the client and server sides of the system 10 enable updates or reconfigurations of the classifiers used to perform feature extraction for compression. Consequently, each video capture device 14 can benefit from the continuous learning performed by the learning platform 50, particularly when numerous video capture devices 14 are contributing to the ever growing body of data collected by the system 10 and made available to the learning platform 50. Since the video capture device 14 is connected via the wireless network 36, remotely triggered updates and reconfigurations can be performed from a server entity, without having to enter the field.

Figure 16:
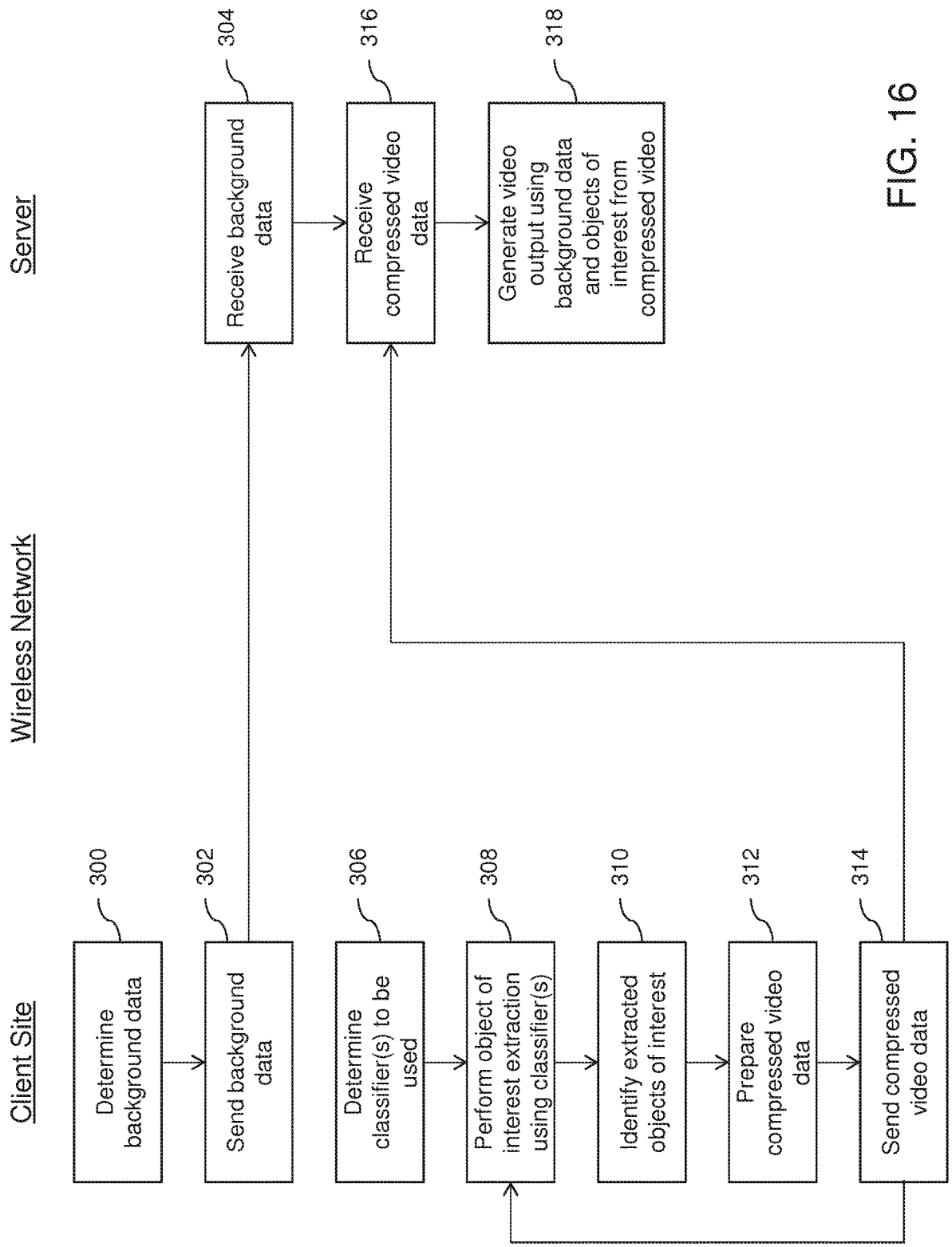
FIG. 16 is a flow chart illustrating example computer executable instructions for obtaining, compressing and wirelessly transmitting video data while sending background data common to multiple video frames.

FIG. 16 is a flow chart illustrating example computer executable instructions for obtaining, compressing and wirelessly transmitting video data while sending background data common to multiple video frames. In the example shown in FIG. 16, it has been found that for static video, particularly in traffic monitoring applications, the background data 72 can also be static, at least for significant periods of time. For example, a video of a traffic intersection 76 would consistently show a roadway pattern subject to construction upgrades, and would likely not change significantly except for changes in seasons. As such, the background data 72 does not need to be updated at the server site (i.e. where the processing and/or application is being performed) nearly as often as the objects of interest, e.g., vehicles that move through the intersection 76. On that basis, background data 72 can be determined at 300 and sent at 302 to the server entity, e.g., the cloud-based object of interest processing device 38. The cloud-based object of interest processing device 38 receives the background data 72 at 304, which can then be subsequently used along with the compressed video data 16 to generate an output that is suitable for machine vision processing and/or human interpretation. Also shown in FIG. 16 is a series of operations that can be performed to generate compressed video data 16. At 306 one or more classifiers to be used in designing features identifying objects of interest are determined in order to perform feature extraction using such classifiers at 308. Objects of interest are extracted at 310 using the classifiers and corresponding features, and the compressed video data 16 is prepared at 312, e.g., by ignoring background data and encoding the objects of interest. The compressed video data 16 is sent to the cloud-based object of interest processing device 38 at 314, which is received by the cloud-based object of interest processing device 38 at 316. The cloud-based object of interest processing device 38 in this example can generate a video output using the background data 72 previously sent, and current objects extracted from the compressed video data 16. As shown in FIG. 16, the client side can continue to obtain and compress video, and send compressed video with updated objects to be augmented with the background data 72. While not shown in FIG. 16, the background data 72 can also be updated on a periodic basis, e.g., seasonally, weekly, daily, or according to a schedule that is less frequent than that used to send the compressed video with the objects of interest.

The objects of interest extracted at 308 according to the classifiers, can be modified or refined based on data determined by the learning platform 50, e.g., to better classify certain features to reduce negative samples.

Figure 17:
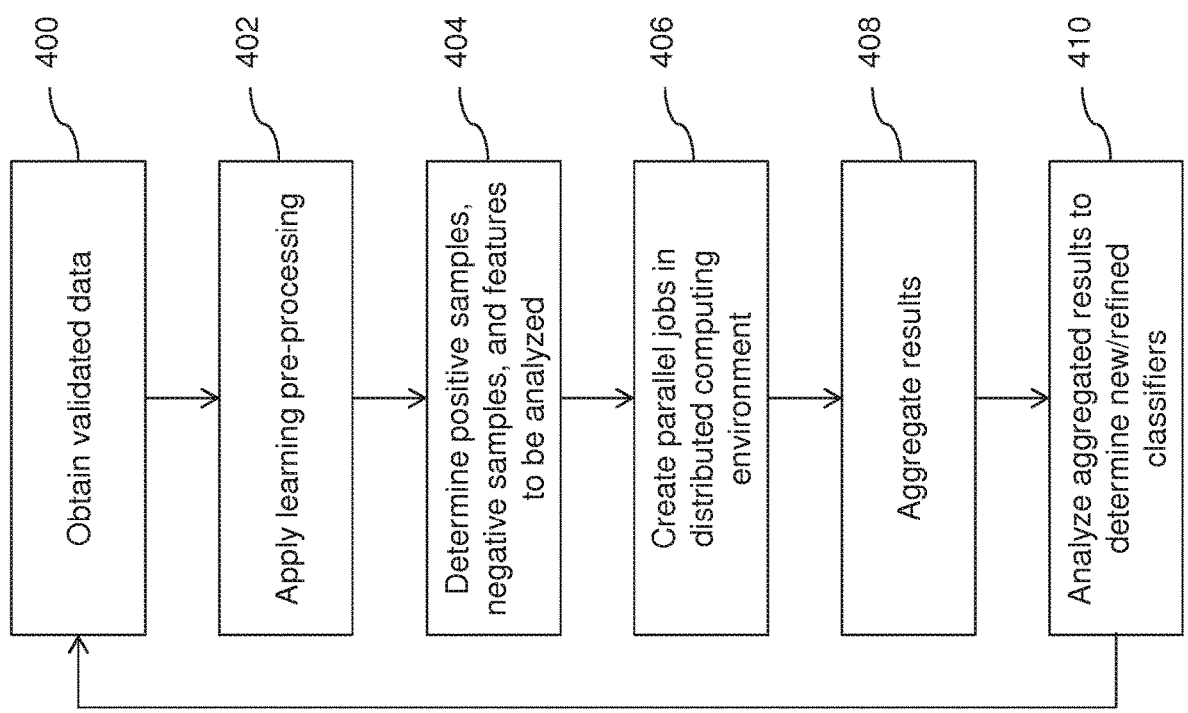
FIG. 17 is a flow chart illustrating example computer executable instructions for analyzing validated data for determining new or refined classifiers using a learning platform.

FIG. 17 is a flow chart illustrating example computer executable instructions that are performed in conducting a training and learning process to a large scale dataset. At 400 the learning platform 50 obtains the validated data, e.g., from a validation stage (see above) and/or from a database and applies a learning pre-processing stage at 402. Based on the validations performed, the learning platform 50 determines the positive samples, negative samples, and features that are to be analyzed at 404, and creates a plurality of parallel computing jobs or tasks to be performed in a distributed manner at 406, using a distributed computing environment (i.e. by accessing available computing resources). The results are aggregated by the learning platform 50 at 408 as discussed above, and the aggregated results are analyzed at 410 to determine new and/or refined classifiers to be subsequently used by the system 10. This process may repeat iteratively as new validated data becomes available.

Figure 18:
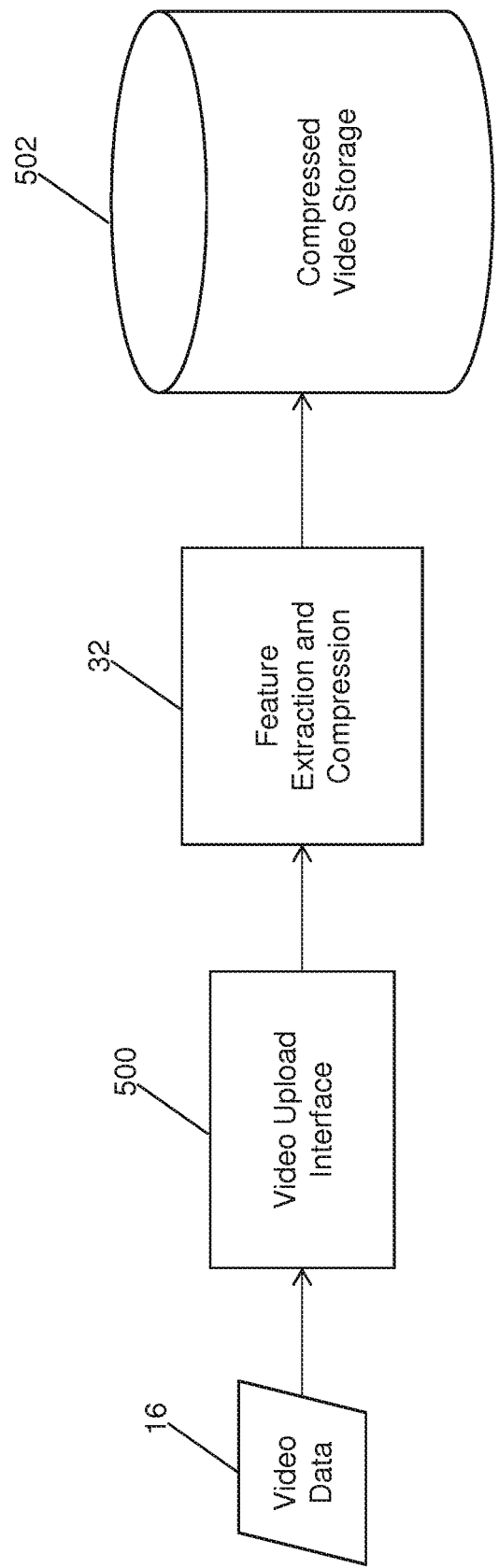
FIG. 18 is a schematic diagram illustrating application of a video compression algorithm for efficient storage.

FIG. 18 is a schematic diagram illustrating application of a video compression algorithm for efficient storage. As discussed above, while compressing the video data 16 according to the principles discussed herein is particularly advantageous for enabling efficient wireless transmission of the video data 16, such compression can also be performed for efficient storage of the video data 16, independent of any wireless transmission. For example, video data 16 in an uncompressed form can be obtained using other delivery mechanisms such as a manual upload online, receipt over a fiber optic or Ethernet wired line, or manual delivery using a portable memory device. In any of these and other scenarios, as shown in FIG. 18, the video data 16 can be provided to a storage system (or server or other entity interested in storing the video data 16 in a compressed form) via a video upload interface 500, e.g., examples of which are provided above. The object of interest extraction and compression module 32 is then used to compress the video data 16 for storage in a compressed video storage device 502, e.g., in a cloud storage service.

Figure 19:
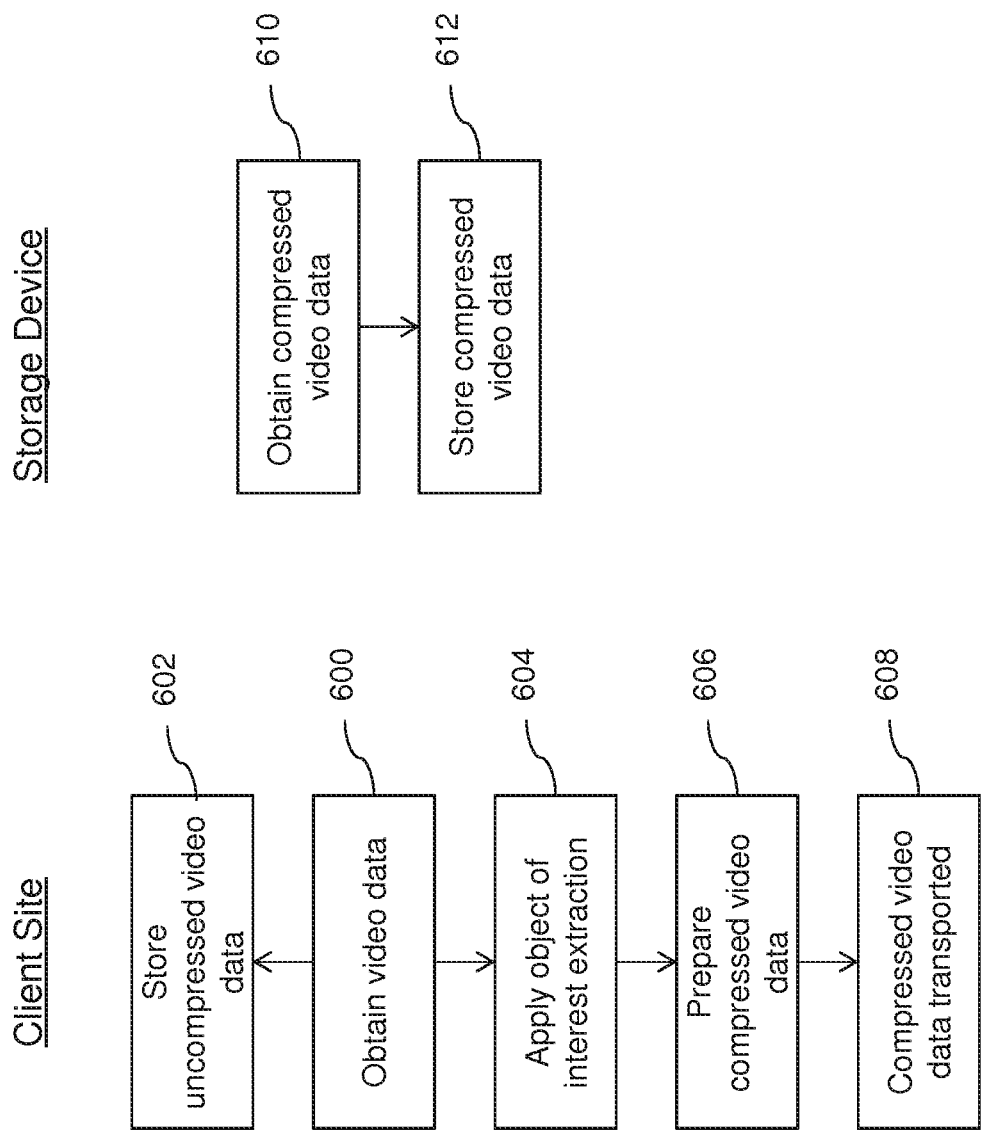
FIG. 19 is a flow chart illustrating example computer executable instructions for obtaining, compressing, transporting, and storing video data absent a wireless transmission channel.

FIG. 19 is a flow chart illustrating example computer executable instructions for obtaining, compressing, transporting, and storing video data without a wireless transmission channel. In FIG. 19, the video data 16 is obtained at 600 and can be stored locally in an uncompressed form at 602. Object of interest extraction is then performed at 604, e.g., as discussed above, and compressed video data 16 prepared at 606. The compressed video data 16 is then transported to enable storage in a storage device at 608. For example, compressed video data 16 can be uploaded using a web interface or saved to a portable memory device for manual transportation. At 610 the compressed video data 16 is obtained, e.g., via a video upload interface 500 as shown in FIG. 18 and the compressed video is stored at 612. In the example shown in FIG. 19, it is assumed that video compression is performed at the client site without wireless transmission.

Figure 20:
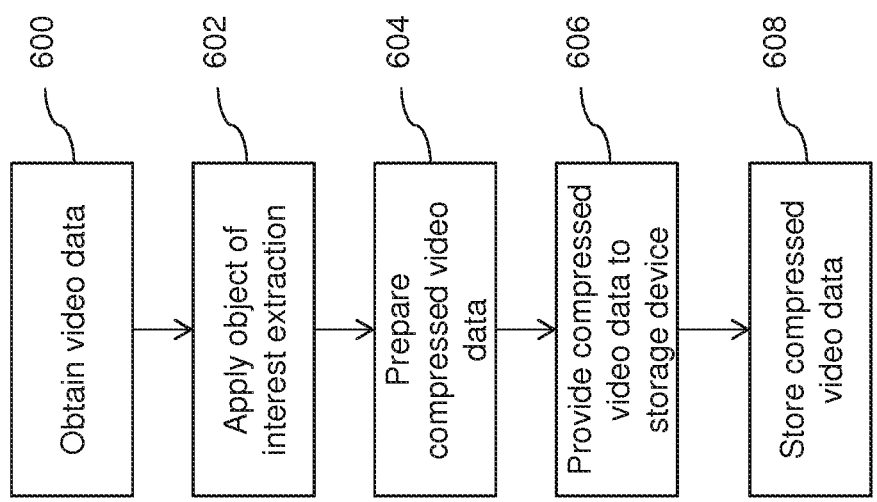
FIG. 20 is a flow chart illustrating example computer executable instructions for compressing video for storage.

However, as shown in FIG. 18, the compression and storage can also be linked such that they are performed using the same device or at the same entity. For example, uncompressed video data 16 can be obtained at 600 and object of interest extraction applied at 602 as shown in FIG. 20, at the same entity and that storing the video data 16. The compressed video data 16 can be prepared at 605, provided to a video storage device at 606, and stored in a compressed form at 608. Therefore, it can be seen that the video compression principles described herein can be applied in various configurations for the purposes of reducing bandwidth requirements, reducing storage requirements, and/or reducing both bandwidth and storage requirements.

While the examples described above mention the application of the object of interest extraction and compression module 32 to traffic related video data 16, it should be noted that the object of interest extraction and compression module 32 can be used in any video-related application where the reduction in size of the video data 16 is desired for transmission and/or storage of the video data. For example, security systems tracking customers in a retail shop can utilize the present video compression techniques to monitor human traffic within the store by classifying humans for extraction from the video data 16. Where at least some background data 72 can be ignored (e.g., consistent structural details such as shelving, facades, etc.), a compression in the video data 16 can be achieved The principles described herein can therefore be adapted to various applications, such as:

Wrong way detector: Vehicles enter the highway on the off ramp instead of the on ramp. A vehicle is detected, and the incident is recorded and compressed and immediately sent to mobile to traffic center and nearby police. The police or other authority can take the appropriate actions to stop the vehicle from driving the wrong way down the highway.

Live video walls: Live video can be reconstructed for intersections connected by mobile, e.g., to address the fact that currently fiber optic connections do not reach all intersections and is often expensive.

Live vehicle maps: Instead of displaying video reconstructions, representative models of vehicles and be used to show live individual movements of vehicles at intersections within a city overlaid on a map.

Historic event recall: Video from intersections can be captured, compressed, and saved to a cloud-based entity. If a traffic incident is reported at a surveillance site, the video can be retrieved and presented to the traffic center. For example, if a person drives through a red light and complains that the signal is broken, the city can retrieve the video and determine if the signal is actually broken or if the driver was simply impatient. In this case, the traffic signal status is also an object of interest and recorded as part of the video stream.

Security applications: Any suitable application where objects of interest are tracked for the purpose of surveillance, theft prevention, etc.

Existing person tracking systems (e.g., at airports, at security gates, store anti-theft systems): Existing person detectors can trigger recording where an object of interest encoding scheme can be implemented to encode people and stolen objects, rather than the entire area being surveyed. The footage can be sent over mobile or wifi to security guards patrolling an area with attachments of compressed video containing specific information about the crime. The original raw video can then be saved to preserve all details of the crime for evidence. Compressed video can be stored at lower cost over longer periods of time to investigate past crimes.

It can be appreciated that to address privacy concerns, technology can be used to anonymize people in video, and to, if permitted, to unblurr faces upon the request of city officials in the event of a crime. By encoding objects of interest into models, the privacy of the individual can be preserved using the fidelity of a model. High fidelity models may contain texture maps capable of reconstructing faces, while low fidelity object models may only contain a rectangle (bounding box of a person) and the path of the person over time. The low fidelity model is suitable to determine customer traffic flow through a store, or patrons through a museum, but the encoding process eliminates the possibility of identifying an individual, thus ensuring their privacy. A similar method can be used to store historic vehicle data. In some regions of the world recorded video is prohibited, however, knowledge of traffic flow can be preserved through the use of low fidelity models to ensure that the drivers privacy is always protected. Additional features can be integrated to store an encrypted high fidelity reconstruction that can only be decrypted through one more or heavily protected keys. E.g. both the mayor and police commission may need to enter their keys to reconstruct the identity of people in a traffic accident, while anyone can see that two cars, modelled as rectangles were involved in a collision.

In addition to being a highly efficient stand-alone encoder, the technology pipeline could also be incorporated into more advanced codecs such as H.265. This particular code is designed to be capable of more controllable compression. For instance, demonstrations have shown how a single image can be compressed in a quad-tree, allowing efficient spatial compression, that is: more resolution in areas of greater detail and less resolution in areas of less detail. This can be also extended to oct-trees to account for time as well. Like H.264, the code still attempts to generalize compression for human viewing, not machine processing. Similarly, the encoder described herein can encapsulated within H.265 as an independent system, which could take advantage of the other components with H.265 for ease of implementation. The resulting codec should have highly compressed traffic (or other application specific) encoding.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the video capture device 14, learning platform 50, cloud-based object of interest processing 38, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of compressing video data, the method comprising:
    configuring an object of interest detector to detect whether objects of interest are located in the video data according to one or more classifiers c;
    training the one or more classifiers c to identify the objects of interest for a specific application using data collected from a plurality of video capture devices in a video processing system by applying one or more machine learning methods;
    configuring an encoder to transform an image region I using a non-linear transformation $\Phi(I)$ into an ordered set of basis transformation parameters $\vec{\theta}$, where $\vec{\theta} = \Phi(I)$ and $I \approx \Phi^{-1}(\vec{\theta})$;
    collecting video data at a video capture device;
    applying the non-linear transformation $\Phi(I)$ to the image region I from the video data to generate compressed video data comprising the set of basis transformation parameters $\vec{\theta}$ associated with the objects of interest; and
    sending the compressed video data from the video capture device to the video processing system to enable the video processing system to decode and reconstruct the video using $\Phi_c^{-1}(\vec{\theta}_i)$, for each object of interest i associated with the corresponding object classifier c.

2. The method of claim 1, further comprising ignoring at least a portion of the transformed data associated with background information in preparing the compressed video data.

3. The method of claim 1, further comprising transporting the compressed video data to an object of interest processing device in the video processing system.

4. The method of claim 3, wherein the compressed video data is transported wirelessly from the video capture device to the object of interest processing device.

5. The method of claim 3, wherein the object of interest processing device is associated with a cloud-based service.

6. The method of claim 3, wherein the compressed video data is transported using at least one of: i) a wired communication connection, and ii) a portable data storage device.

7. The method of claim 3, further comprising storing the compressed video data.

8. The method of claim 1, further comprising storing uncompressed video data.

9. The method of claim 1, further comprising providing the compressed video data to an intelligent traffic system (ITS) controller interface via an ITS object interface.

10. The method of claim 1, wherein identifying the at least one object of interest comprises decomposing the video data to generate an encoded stream comprising one or more models associated with the objects of interest, the encoded stream enabling the reconstruction of the video data.

11. The method of claim 1, further comprising sending at least one background feature to an object of interest processing device to enable reconstruction of the video data using the compressed video data.

12. The method of claim 11, further comprising subsequently sending additional background information to capture changes to the at least one background feature.

13. The method of claim 1, further comprising receiving data generated by a learning platform, the data comprising at least one of: i) a new classifier, and ii) a modification to an existing classifier.

14. A non-transitory computer readable medium comprising computer executable instructions for:
    configuring an object of interest detector to detect whether objects of interest are located in the video data according to one or more classifiers c;
    training the one or more classifiers c to identify the objects of interest for a specific application using data collected from a plurality of video capture devices in a video processing system by applying one or more machine learning methods;
    configuring an encoder to transform an image region I using a non-linear transformation $\Phi(I)$ into an ordered set of basis transformation parameters $\vec{\theta}$, where $\vec{\theta} = \Phi(I)$ and $I \approx \Phi^{-1}(\vec{\theta})$;
    collecting video data at a video capture device;
    applying the non-linear transformation $\Phi(I)$ to the image region I from the video data to generate compressed video data comprising the set of basis transformation parameters $\vec{\theta}$ associated with the objects of interest; and
    sending the compressed video data from the video capture device to the video processing system to enable the video processing system to decode and reconstruct the video using $\Phi_c^{-1}(\vec{\theta}_i)$, for each object of interest i associated with the corresponding object classifier c.

15. A video compression module comprising at least one processor and at least one memory, the at least one memory comprising computer executable instructions for:
    configuring an object of interest detector to detect whether objects of interest are located in the video data according to one or more classifiers c;
    training the one or more classifiers c to identify the objects of interest for a specific application using data collected from a plurality of video capture devices in a video processing system by applying one or more machine learning methods;
    configuring an encoder to transform an image region I using a non-linear transformation $\Phi(I)$ into an ordered set of basis transformation parameters $\vec{\theta}$, where $\vec{\theta} = \Phi(I)$ and $I \approx \Phi^{-1}(\vec{\theta})$;
    collecting video data at a video capture device;

applying the non-linear transformation $\Phi(I)$ to the image region I from the video data to generate compressed video data comprising the set of basis transformation parameters $\vec{\theta}$ associated with the objects of interest; and sending the compressed video data from the video capture device to the video processing system to enable the video processing system to decode and reconstruct the video using $\Phi_c^{-1}(\vec{\theta_i})$, for each object of interest i associated with the corresponding object classifier c.

16. The video compression module of claim 15, further comprising instructions for ignoring at least a portion of the transformed data associated with background information in preparing the compressed video data.

17. The video compression module of claim 15, further comprising instructions for transporting the compressed video data to an object of interest processing device in the video processing system.

18. The video compression module of claim 15, wherein identifying the at least one object of interest comprises decomposing the video data to generate an encoded stream comprising one or more models associated with the objects of interest, the encoded stream enabling the reconstruction of the video data.

19. The video compression module of claim 15, further comprising instructions for sending at least one background feature to an object of interest processing device to enable reconstruction of the video data using the compressed video data.

20. The video compression module of claim 19, further comprising instructions for subsequently sending additional background information to capture changes to the at least one background feature.

21. The method of claim 1, further comprising:

reconstructing the video using $\Phi_c^{-1}(\vec{\theta_i})$; and using the compressed video data in the specific application.

22. The method of claim 1, further comprising:

using the machine learning platform to apply the one or more machine learning methods to the compressed video data and other data collected from the plurality of other video capture devices in the video processing system, to refine the non-linear transformation $\Phi(I)$ and to refine the one or more classifiers c, with features from the compressed video data and the other data; and sending an update for the object of interest detector $\Phi(I)$ and/or the encoder to the video capture device based on the refining for subsequent video processing.

23. The video compression module, of claim 15, further comprising instructions for:

reconstructing the video using $\Phi_c^{-1}(\vec{\theta_i})$ and using the compressed video data in the specific application.

24. The video compression module of claim 15, further comprising instructions for:

using the machine learning platform to apply the one or more machine learning methods to the compressed video data and other data collected from the plurality of other video capture devices in the video processing system, to refine the non-linear transformation $\Phi(I)$ and to refine the one or more classifiers c, with features from the compressed video data and the other data; and sending an update for the object of interest detector $\Phi(I)$ and/or the encoder to the video capture device based on the refining for subsequent video processing.

* * * * *